(12) United States Patent
Peng et al.

(10) Patent No.: US 11,480,807 B2
(45) Date of Patent: Oct. 25, 2022

(54) ILLUMINATION SYSTEM

(71) Applicant: Meta Platforms Technologies, LLC, Menlo Park, CA (US)

(72) Inventors: Fenglin Peng, Redmond, WA (US); Ying Geng, Bellevue, WA (US); Oleg Yaroshchuk, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 142 days.

(21) Appl. No.: 16/872,101

(22) Filed: May 11, 2020

(65) Prior Publication Data
US 2021/0349326 A1 Nov. 11, 2021

(51) Int. Cl.
G02B 27/28 (2006.01)
G02B 27/01 (2006.01)
G02B 27/42 (2006.01)
G02F 1/1362 (2006.01)
G02F 1/1335 (2006.01)
G02B 5/30 (2006.01)
G02B 27/00 (2006.01)

(52) U.S. Cl.
CPC ....... G02B 27/283 (2013.01); G02B 27/0172 (2013.01); G02B 27/425 (2013.01); G02F 1/136277 (2013.01); G02B 2027/0178 (2013.01)

(58) Field of Classification Search
USPC .......................................................... 345/8
See application file for complete search history.

(56) References Cited

U.S. PATENT DOCUMENTS

| 5,914,811 | A  | * | 6/1999  | Chen ................... G02B 27/285 |
|           |    |   |         | 359/569                              |
| 7,457,493 | B1 | * | 11/2008 | Li ........................ G02F 1/292 |
|           |    |   |         | 385/16                               |
| 11,280,997| B1 |   | 3/2022  | Gao                                  |
| 2003/0184864 | A1 | * | 10/2003 | Bruzzone ............. G02B 27/145 |
|           |    |   |         | 359/489.09                           |
| 2005/0206846 | A1 | * | 9/2005  | Yeung ................. H04N 9/3117 |
|           |    |   |         | 348/E9.027                           |
| 2014/0168755 | A1 | * | 6/2014  | Clowes .................. H01S 3/067 |
|           |    |   |         | 359/341.1                            |
| 2017/0307890 | A1 | * | 10/2017 | Wang ..................... G02C 7/022 |
| 2018/0239147 | A1 | * | 8/2018  | Schowengerdt ...... G02B 6/0026 |
| 2019/0223729 | A1 | * | 7/2019  | Frisken ................. G02B 27/00 |
| 2019/0258073 | A1 | * | 8/2019  | Sissom ............... G02B 27/283 |
| 2020/0389633 | A1 | * | 12/2020 | Guo ..................... H04N 9/3105 |

(Continued)

OTHER PUBLICATIONS

Crawford et al., "Liquid-crystal diffraction gratings using polarization holography alignment techniques," Journal of Applied Physics, 98, Dec. 2005, 11 pp.

(Continued)

*Primary Examiner* — Chineyere D Wills-Burns
(74) *Attorney, Agent, or Firm* — Shumaker & Sieffert, P.A.

(57) ABSTRACT

An example optical assembly includes a display, a light source for illuminating the display, and a first diffraction type polarizing beam splitter (DT-PBS) configured to direct light from a first light director, wherein the first DT-PBS is polarization sensitive and configured to direct, based on polarization, a first portion of light towards the display.

18 Claims, 25 Drawing Sheets

(56) References Cited

U.S. PATENT DOCUMENTS

2022/0050298 A1* 2/2022 Klug .................. G02B 27/0972

OTHER PUBLICATIONS

Doane, "Polymer-Dispersed Liquid Crystals: Boojums at Work," MRS Bulletin, Jan. 1991, 7 pp.
Glushchenko et al., "Memory effect in filled nematic liquid crystals," Liquid Crystals, vol. 23, No. 2, 1997 6 pp.
Moheghi, "LC/Polymer Composites, Scattering Properties and Application in Displays," May 2017, 130 pp.
Murat et al., "Gradually tapered light pipes for illumination of LED projectors," Journal of the SID 15/7, 2007, 8 pp.
Natarajan et al., "Switchable Holographic Polymer-Dispersed Liquid Crystal Reflection Gratings Based on Thiol-Ene Photopolymerization," American Chemical Society, Apr. 22, 2003, 8 pp.
Oh et al., "Numerical analysis of polarization gratings using the finite-difference time-domain method," Physical Review A 76, Oct. 12, 2007, 8 pp.
Peng et al., "Freeform mirror for illumination system of color-sequential LCOS pico projector," Novel Optical Systems Design and Optimization XVII, Proc. of SPIE vol. 9193, 9193DY-1, 2014, 10 pp.
Sakhno et al., "Fabrication and performance of efficient thin circular polarization gratings with Bragg properties using bulk photo-alignment of a liquid crystalline polymer," Applied Physics B, Feb. 28, 2018, 10 pp.
Spruce et al., "Polymer dispersed liquid crystal (PDLC) films," Electronics & Communication Engineering Journal, Apr. 1992, 10 pp.

U.S. Appl. No. 16/872,109, naming Inventors Peng et al., filed May 11, 2020.
Waldern et al., "DigiLens switchable Bragg grating waveguide optics for augmented reality applications," SPIE Photonics Europe, Strasbourg, France, vol. 10676 106760G-1, 2018, 17 pp.
Weng et al., "Polarization volume grafting with high efficiency and large diffraction angle," Optics Express, vol. 24, No. 16, Aug. 8, 2016, 14 pp.
Yamaguchi et al., "Electro-optical Properties and Morphology of Reverse Scattering Mode TN LCD," Journal of Photopolymer Science and Technology, vol. 25, No. 3, 2012, 4 pp.
Yaroshchuk et al., "electro-optics and structural peculiarities of liquid crystal-nanoparticle-polymer composites," Physical Review E 72, Nov. 21, 2005, 12 pp.
Yokomori, "Dielectric surface-relief gratings with high diffraction efficiency," Optical Society of America, 1984, 8 pp.
Search Report from counterpart European Application No. 21168275.2, dated Sep. 14, 2021, 10 pp.
Oh et al., "Achromatic diffraction from polarization gratings with high efficiency", Optics Letters, vol. 33, Oct. 3, 2008, 3 pp.
Nersisyan et al, "Polarization insensitive imaging through polarization gratings", Optics Express, vol. 17, Feb. 2, 2009, 14 pp.
Kobashi et al., "Planar optics with patterned chiral liquid crystals", Nature Photonics, vol. 10, Apr. 11, 2016, 5 pp.
Non-Final Office Action dated Mar. 30, 2022 for U.S. Appl. No. 16/872,109, filed Mar. 11, 2020, 11 pages.
Response to Office Action dated Mar. 30, 2022 for U.S. Appl. No. 16/872,109, filed May 11, 2020, 3 pages.

* cited by examiner

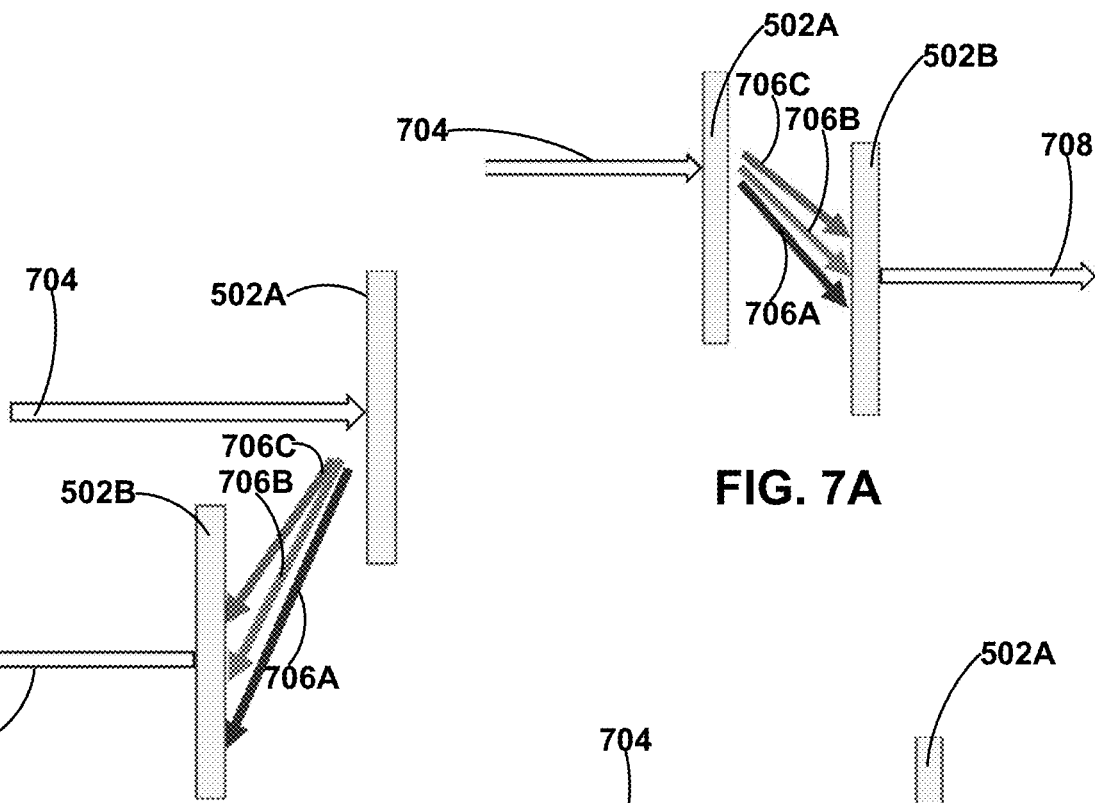
FIG. 7A
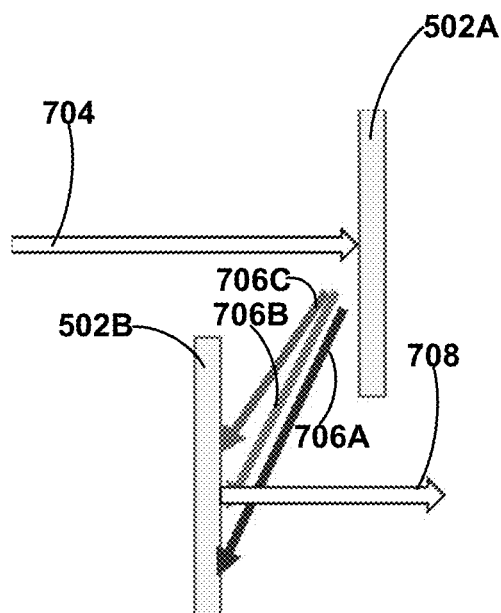
FIG. 7C
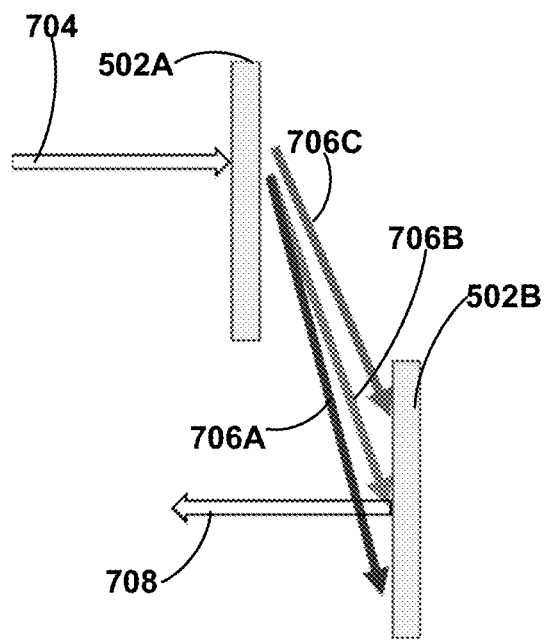
FIG. 7B
FIG. 7D

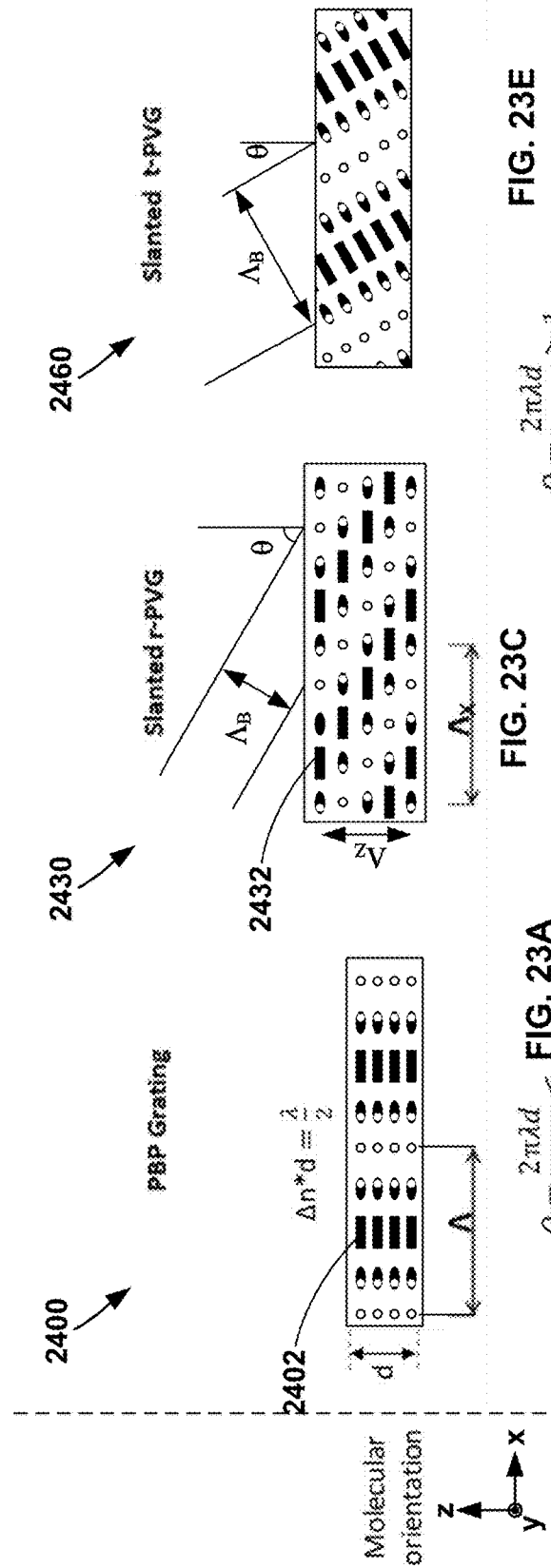
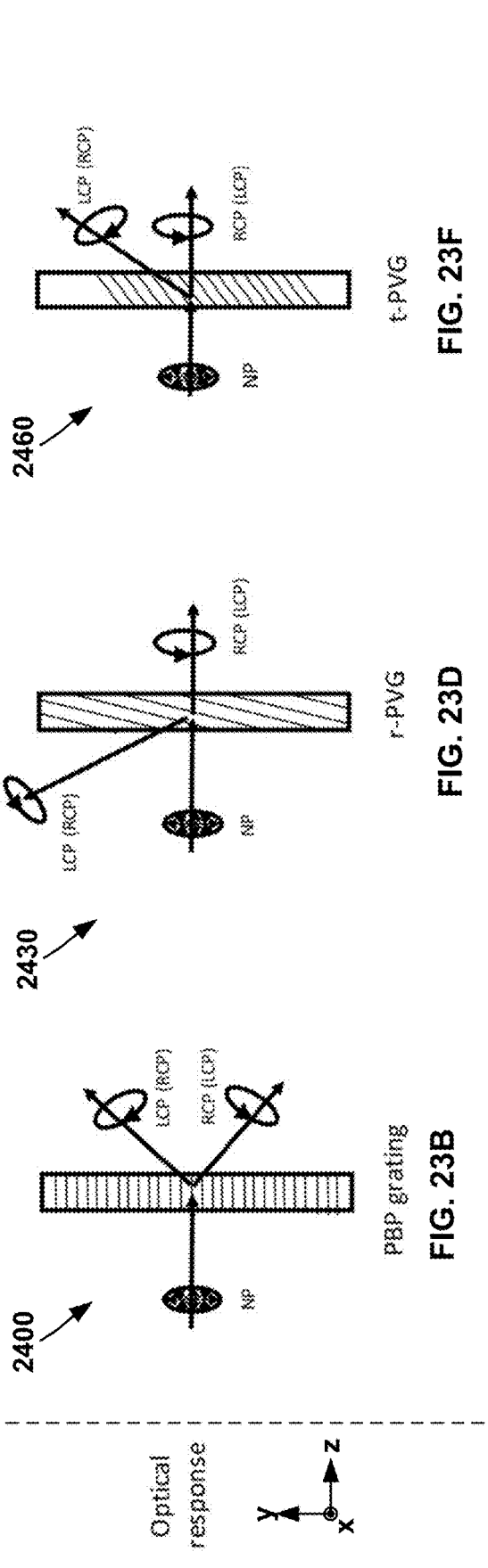

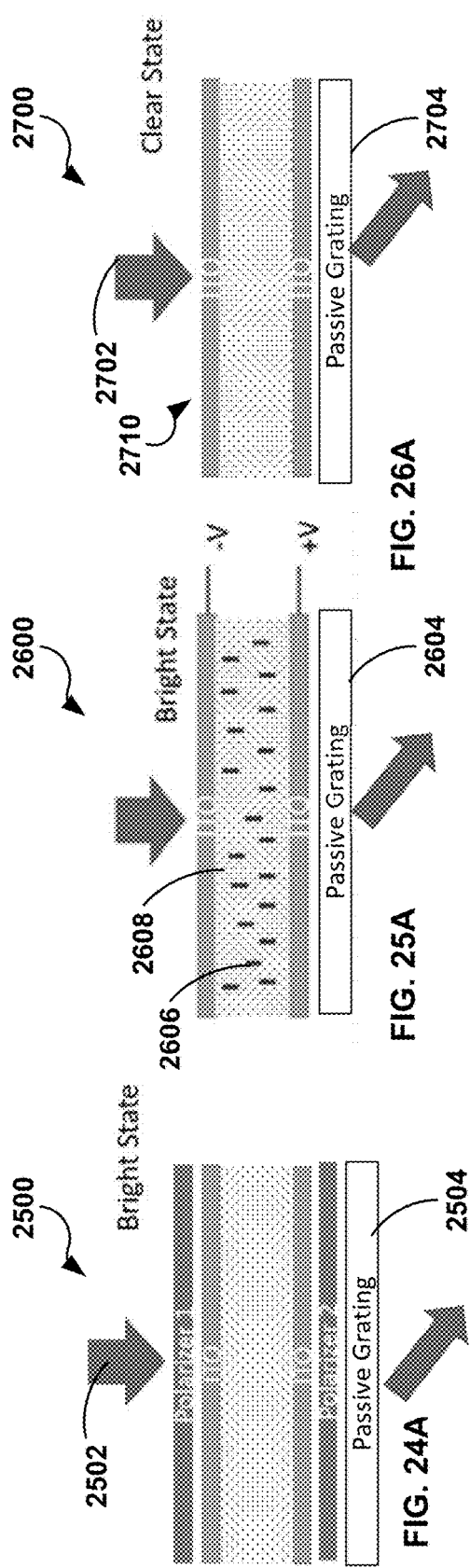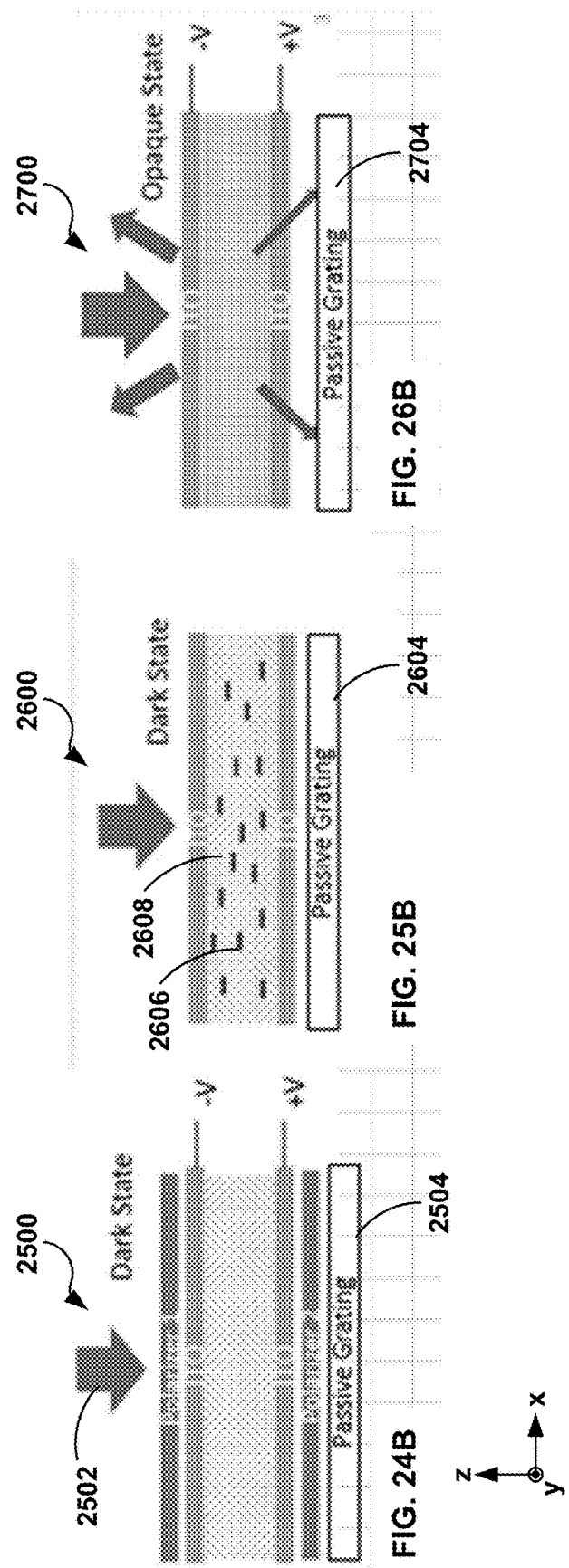

ILLUMINATION SYSTEM

TECHNICAL FIELD

This disclosure generally relates to optical elements and optical systems implemented in various types of electronic systems and devices.

BACKGROUND

Liquid crystal on silicon (LCoS) active-matrix devices are miniaturized reflective devices using a liquid crystal layer on top of a silicon backplane. LCoS can be used for spatial light modulation, wavelength selective switching, structured illumination, and optical pulse shaping, as part of the illumination system for projection televisions and near-eye projection displays, among other applications. LCoS systems encode spatial information (e.g., display information) as a phase delay to the light in a pixel of the LCoS active matrix by applying electric fields across the liquid crystal of the LCoS pixels.

SUMMARY

In general, the present disclosure is directed to optical assemblies configured to direct polarized light. The optical assemblies may be used in, for example, an LCoS projector, an eye tracking system, or the like. For instance, the optical assembly may be used to extract and direct polarized light from the projector light source to an LCoS display and from the LCoS display to an optical combiner. The optical assembly may include two or more directors of light, at least one of which is a diffraction type polarizing beam splitter (DT-PBS) that splits unpolarized light into two beams with orthogonal linear or circular polarizations and directs each beam in a different direction. The present disclosure provides optical assemblies based on DT-PBS's which include polarization sensitive gratings such as transmissive and reflective polarization volume gratings (PVGs), Pancharatnam-Berry Phase (PBP) gratings, liquid crystal filled surface relief gratings (LC-SRG), holographic polymer dispersed liquid crystal (PDLC) gratings, or any other optic that can direct a first and a second polarization state in different directions, or redirect a first polarization state without redirecting the second polarization state. Diffraction type polarization beam splitters have the advantage of being thin and lightweight, allowing small form factor LCoS systems not possible using conventional polarizing beam splitter cubes. In addition, diffraction type polarization beam splitters can be designed in pairs to compensate for dispersion.

In other examples, the present disclosure is also directed to an optical assembly for directing light to an eye tracking detector after reflecting off an eye. Diffraction type polarization beam splitters, because they are thin, lightweight, flexible in design and can compensate for dispersion, enable alternative form factors and the use of broadband illumination for eye tracking, e.g., LEDs.

In some examples, DT-PBS can extract a portion of light having a first polarization state and redirect it in transmission, for example into diffraction grating orders. In other examples, the DT-PBS can extract a portion of light having the first polarization state and redirect it in reflection, e.g. redirect the light to exit the DT-PBS through the same surface as which it was incident on the DT-PBS, for example into diffraction grating orders in reflection.

In some examples, the first and the second split polarization states are orthogonal. For example, the DT-PBS can redirect by transmission or reflection, the first linear polarization at a first angle and transmit the second, orthogonal linear polarization, e.g., the linear polarization state rotated 90° with respect to the first linear polarization state. By way of another example, the DT-PBS can redirect, by transmission or reflection, the right-handed circular polarization (RCP) and transmit without deflection the left-handed circular polarization (LCP), and vice versa. By way of one more example, the DT-PBS can transmit and redirect light of both right circular polarization (RCP) and left circular polarization (LCP) in different directions, e.g., in different diffraction orders.

In some examples, the disclosure describes an optical assembly comprising: a display, a light source for illuminating the display, and a first DT-PBS configured to direct light from a first light director, wherein the first DT-PBS is polarization sensitive and configured to direct, based on polarization, a first portion of light towards the display.

In some examples, the disclosure describes a head mounted display (HMD) comprising: a display, a light source for illuminating the display, a first DT-PBS configured to direct light from a first light director, wherein the first DT-PBS is polarization sensitive and configured to direct, based on polarization, a first portion of light towards the display.

In some examples, the disclosure describes a method of directing light comprising: directing light from a light source to a first DT-PBS by a first light director; and directing, based on polarization, a first portion of light towards a display by the first DT-PBS.

In some examples, the disclosure describes an eye-tracking optical assembly comprising: a light source for illuminating an eye; a first DT-PBS; and a second DT-PBS, wherein the first DT-PBS is configured to direct, based on polarization, a first portion of light from the second DT-PBS towards an eye-tracking detector.

In some examples, the disclosure describes a head-mounted display (HMD) comprising: a light source for illuminating an eye; a first DT-PBS configured to direct, based on polarization, a first portion of light from a second DT-PBS towards an eye-tracking detector.

In some examples, the disclosure describes a method of tracking one and/or both eyes of a HMD user comprising: directing light from a light source towards a user's eye; reflecting the light from the user's eye towards a first DT-PBS; directing, based on polarization, a first portion of the light from the first DT-PBS towards a second DT-PBS; and directing, based on polarization, the first portion of the light from the second DT-PBS towards a detector.

Thus, the disclosed examples provide an optical assembly that can be lighter, thinner, more compact and allow for a broader range of optical illumination sources and projection paths in a display projection system than conventional polarizing beam splitter cubes. Furthermore, the disclosed examples provide original and effective solutions for eye-tracking systems.

BRIEF DESCRIPTION OF THE DRAWINGS

FIGS. 7A-7D are illustrations depicting an example combination of two diffraction type polarizing beam splitters, in accordance with the techniques described in this disclosure.

FIGS. 23A-23F are schematic diagrams illustrating examples of a PBP grating 2400, a reflective PVG (r-PVG) 2430, and a transmissive PVG (t-PVG) 2460, in accordance with the techniques described in this disclosure.

FIGS. 24A-24B are schematic diagrams illustrating an example liquid crystal shutter in combination with a passive diffraction grating, in accordance with the techniques described in this disclosure.

FIGS. 25A-25B are schematic diagrams illustrating another example liquid crystal shutter in combination with a passive diffraction grating, in accordance with the techniques described in this disclosure.

FIGS. 26A-26B are schematic diagrams illustrating another example liquid crystal shutter in combination with a passive diffraction grating, in accordance with the techniques described in this disclosure.

DETAILED DESCRIPTION

Figure 1:
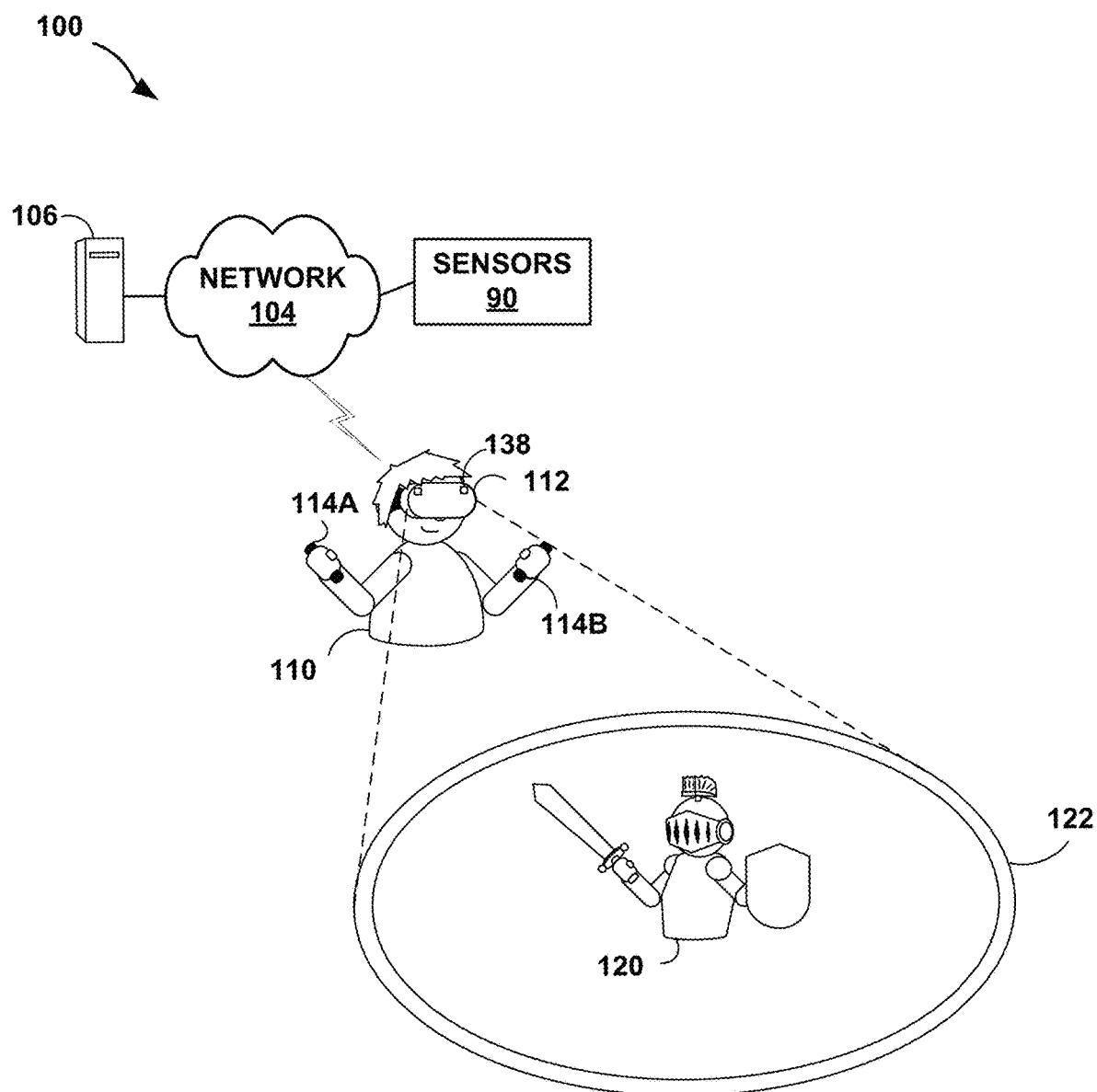
FIG. 1 is an illustration depicting an example artificial reality system that includes at least one diffraction type polarizing beam splitter, in accordance with the techniques described in this disclosure.

In typical LCoS imaging applications, an illumination source is directed towards the LCoS display through a conventional polarizing beam splitter (PBS). The PBS passes or directs light of a polarization, for example linear polarization, towards the LCoS display. The LCoS display encodes image information via spatial modulation of the phase, and therefore the polarization, of the incident light, and reflects the light back to the PBS. The PBS directs a portion of the reflected light, based on polarization, towards a projection system for projection of the image information to an image plane. Often, the conventional PBS is heavy and constrains the mechanical design, e.g., the form factor, of the LCoS illumination system.

The present disclosure is directed to optical assemblies configured to polarize and direct light. The optical assemblies may be used in, for example, an artificial reality, mixed reality, virtual reality, or augmented reality system utilizing an LCoS projector, an eye tracking system, or the like. For instance, the optical assembly may be used to polarize and direct light to an LCoS display and then additionally receive polarized light reflected from the LCoS display and direct it to a projection system. The optical assembly may include two or more directors of light, whose function is to redirect at least portion of incident light. The light directors may include conventional optical elements such as mirrors, prisms, etc. In the present disclosure, at least one light director may be a DT-PBS that is configured to split light into two orthogonal polarization states (linear or circular), redirect a first polarization state in a first direction while directing a second polarization state in a different direction or without redirecting the second polarization state. The DT-PBS may include relatively thin, light-weight optical elements, such as transmissive and reflective PVG, a liquid crystal filled surface relief grating (LC SRG), a holographic polymer dispersed liquid crystal gratings (PDLC), a PBP grating or any other optic that can selectively transmit one polarization while directing a second polarization state in a different direction or without redirecting the second polarization state. DT-PBS's have the advantage of being thin and lightweight, allowing LCoS system to have a small form factors not possible using conventional optic. In addition, DT-PBS can be designed in pairs to at least partially compensate for dispersion.

In other examples, the present disclosure is also directed to an optical assembly for directing light to an eye tracking detector after reflecting off an eye. DT-PBS's, because they are thin, lightweight, and can compensate for dispersion, enable alternative form factors and the use of broadband illumination for eye tracking, e.g., LEDs. In some examples, broadband illumination may include light comprising a range of wavelengths, for example, a 100 nm range of wavelengths, a 500 nm range of wavelengths, the range of visible wavelengths, the range of near-infrared, mid-infrared, or far-infrared wavelengths, or any combination thereof. In some examples, narrowband illumination, e.g. from a narrowband light source, may include light comprising a range of wavelengths, for example, a 1 nm range of wavelengths, a 5 nm range of wavelengths, a 50 nm range of wavelengths, a 100 nm range of wavelengths, a range of wavelengths less than a broadband range of wavelengths (e.g. as from a wavelength-filtered broadband light source), or any combination thereof. In some examples, monochromatic illumination, e.g. from a monochromatic light source, may include light comprising a small range of wavelengths, for example, less than a nm range of wavelengths, or the like. Monochromatic illumination may include illumination from, for example, a laser, a gas discharge light source, a mercury lamp, or any narrowband or broadband light source with enough wavelength filtering to reduce the range of wavelengths included in the illumination.

In some examples, the DT-PBS's can redirect the first polarization state in transmission, e.g., into diffraction grating orders. In other examples, the DT-PBS can redirect the first polarization state in reflection, e.g., redirect the light to exit the polarization sensitive light director through the same surface as which it was incident on the polarization sensitive light director, e.g., into diffraction grating orders in reflection.

In some examples, the first polarization state is orthogonal to the second polarization state. For example, the DT-PBS can split non-polarized light in two orthogonal linear polarizations and redirect one linear polarization at a first angle and transmit the orthogonal linear polarization, e.g., the linear polarization state rotated 90° with respect to the first linear polarization state. By way of another example, the DT-PBS can split non-polarized light in two orthogonal circular polarizations and redirect right-handed circular polarization (RCP) and transmit left-handed circular polarization (LCP), and vice versa.

FIG. 1 is an illustration depicting an example artificial reality system that includes at least one polarization sensitive light director, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106. In some examples, artificial reality system 100 may be any of an artificial reality system, an augmented reality system, a mixed reality system, and/or a virtual reality system.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content, the HMD 112 can include an electronic display. In some examples, the display may include a projection display, such as a liquid crystal on silicon (LCoS) projector. In accordance with examples disclosed herein, the LCoS projector may include a light source, at least one DT-PBS, an LCoS display, and projection optics to project an image positioned at least partially within the field of view 130. The at least one DT-PBS may be used as a compact and lightweight system component to direct light of some polarization from the light source to the LCoS display, e.g. the at least one DT-PBS may be lighter and thinner than current LCoS light directors such as conventional polarizing beam splitter cubes (PBS). For example, a conventional PBS cube used in a conventional LCoS projector redirects a portion of incident light having a first linear polarization in a perpendicular direction with respect to the direction of the light from the light source via the polarizing interface of the PBS, which is set at an angle of 45° with respect to the direction of the light from the light source. As such, the depth, e.g., thickness, of the PBS is equal to the beam width of the light from the light source in order to achieve a polarizing interface at 45°. Typically, in a conventional LCoS projection system, light from the light source is pre-polarized by a clean-up polarizer to a linear polarization state that is passed by the PBS, e.g., is not redirected at the polarizing interface of the PBS, and reflected back to the PBS by a LCoS display. The LCoS display encodes spatial information in the light, e.g., an image, via phase delays introduced by the LC pixels of the display. The bright and dark states of the image correspond to two linear orthogonal polarizations, which are special cases of elliptical polarization. The light of first linear polarization corresponding to "bright" pixels of display is reflected at a 90° angle by the polarizing interface of the PBS towards an optical combiner, whereas the light of the orthogonal linear polarization corresponding to "dark" pixels passes through the PBS cube without reflection and thus does not reach the optical combiner. The light of other polarization states that appeared after passing other pixels is partially reflected and transmitted by the PBS for pixels of varying "gray" levels. As such, a conventional LCoS projector utilizing a PBS cube uses a "transmit-reflect" configuration.

In accordance with examples disclosed here, the LCoS projector utilizing diffraction type polarizing splitters can use multiple configurations, allowing for increased flexibility in design and form factor of the projector. For example, in some examples, the LCoS projector utilizing DT-PBS may have a "reflect-transmit" configuration as illustrated and described below with respect to FIG. 8, a "transmit-transmit" configuration as illustrated and described below with respect to FIG. 9, a "reflect-reflect" configuration as illustrated and described below with respect to FIG. 10, and/or a "transmit-reflect" configuration as illustrated and described below with respect to FIG. 11.

Figure 2A:
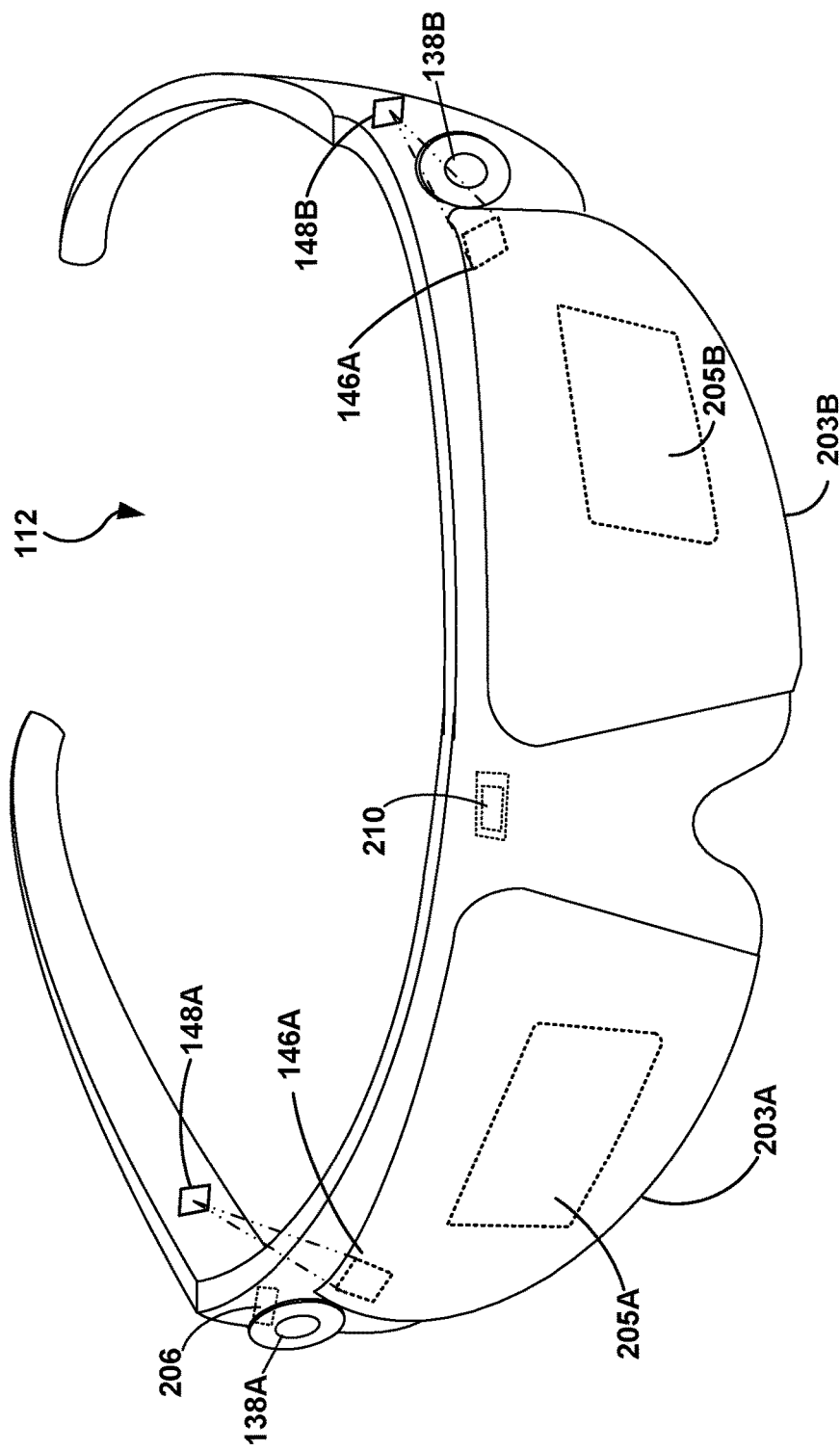
FIG. 2A is an illustration depicting an example HMD that includes at least one diffraction type polarizing beam splitter, in accordance with techniques described in this disclosure.

FIG. 2A is an illustration depicting an example HMD 112 that includes at least one polarization sensitive light director, in accordance with techniques described in this disclosure. HMD 112 of FIG. 2A may be an example of HMD 112 of FIG. 1. As shown in FIG. 2A, HMD 112 may take the form of glasses. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2A includes one or more windows 203A and 203B (collectively, "windows 203"). Windows 203 may be substantially transparent allowing a user a view of objects in a real-world scene through windows 203. Windows 203 may also be light guides, e.g. waveguides, for light injected into windows 203 by one or more projectors 148A and 148B (collectively, "projectors 148"). Windows 203 may include one or more couplers 146A and 146B (collectively, "couplers 146") configured to inject light into windows 203 as lightguides. Windows 203 may further include and one or more combiners 205A and 205B (collectively, "combiners 205") configured to extract light from windows 203, e.g., light from projectors 248 coupled into windows 203. Combiners 205 may be further configured to subtend the user's 110 field of view of a real-world scene, such that both light from objects in a real-world scene may transmit through combiners 205 and be combined with light that comprises virtual objects, e.g. extracted from windows 203 from projectors 148. In some examples, the known orientation and position of windows 203 relative to the front frame of HMD 112 is used as a frame of reference, also referred to as a local origin, when tracking the position and orientation of HMD 112 for rendering artificial reality content according to a current viewing perspective of HMD 112 and the user. In some examples, the projectors 148 can provide a stereoscopic display for providing separate images to each eye of the user.

In the example shown, the combiners 205 cover a portion of the windows 203, subtending a portion of the field of view viewable by a user 110 through the windows 203. In other examples, the combiners 205 can cover other portions of the windows 203, or the entire area of the windows 205.

As further shown in FIG. 2A, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on the combiners 205.

To provide virtual content, the HMD 112 can include an electronic display, for example, as a component of projectors 148. In some examples, the display may include a projection display, such as a liquid crystal on silicon (LCoS) projector. In accordance with examples disclosed herein, the LCoS projector may include a light source, light directors at least one of which is a DT-PBS, an LCoS display, and projection optics to project an image positioned at least partially within the field of view. The at least one DT-PBS may be used as a compact and lightweight system component to direct light from the light source to the LCoS display, e.g. the at least one polarization sensitive light director may be lighter and thinner than current LCoS light directors such as polarizing beam splitter cubes (PBS).

Figure 2B:
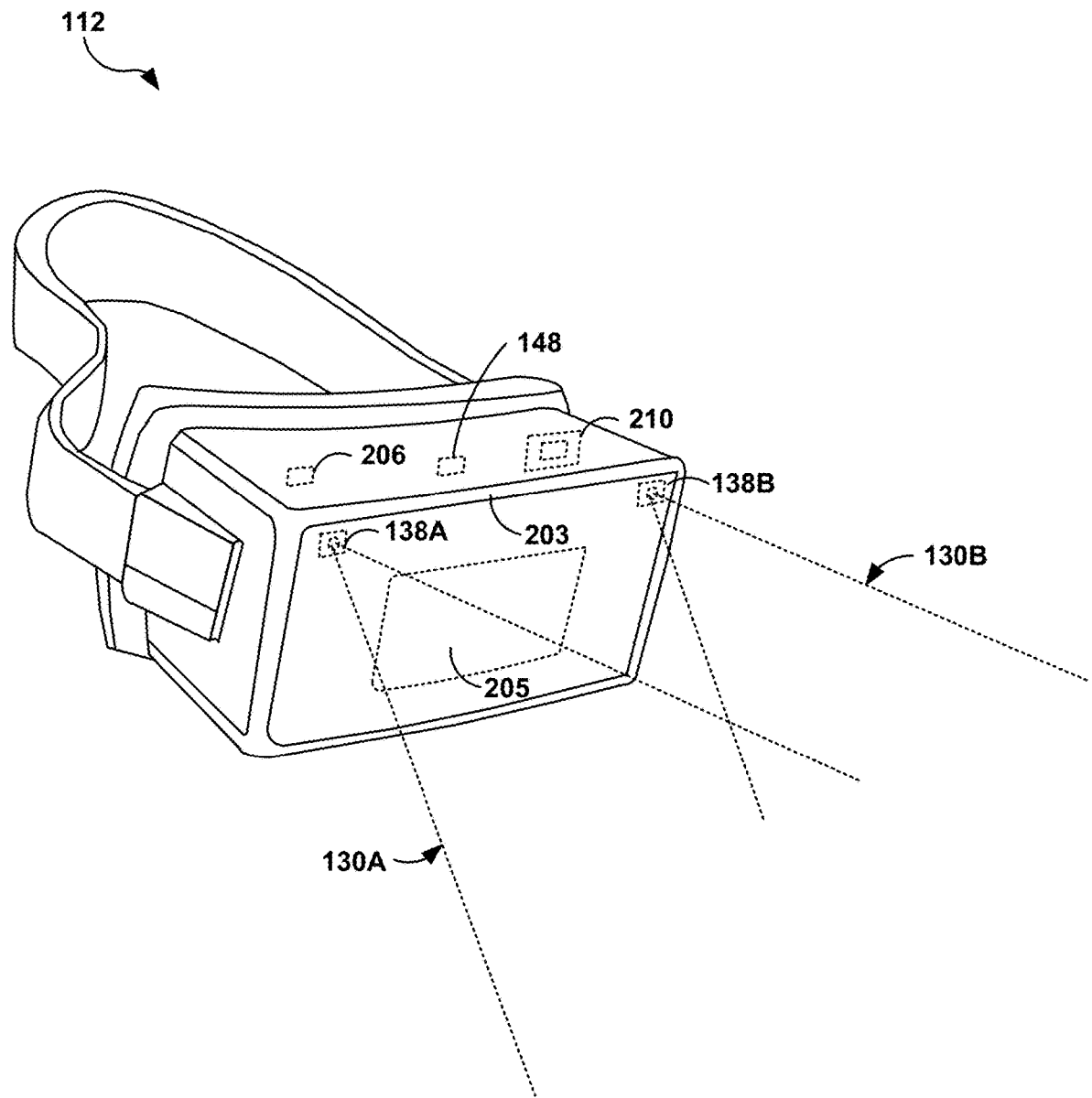
FIG. 2B is an illustration depicting another example HMD that includes at least one diffraction type polarizing beam splitter, in accordance with techniques described in this disclosure.

FIG. 2B is an illustration depicting another example HMD 112, in accordance with techniques described in this disclosure. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes a window 203 configured to present artificial reality content to the user via the combiner 205. In some examples, the known orientation and position of window 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

To provide virtual content, the HMD 112 can include an electronic display, for example, as a component of projectors 148. In some examples, the display may include a projection display, such as a liquid crystal on silicon (LCoS) projector. In accordance with examples disclosed herein, the LCoS projector may include a light source, at least one DT-PBS, an LCoS display, and projection optics to project an image positioned at least partially within the field of view. The at least one DT-PBS may be used as a compact and lightweight system component to direct light from the light source to the LCoS display, e.g. the at least one DT-PBS may be lighter and thinner than current LCoS light directors such as polarizing beam splitter cube (PBS).

Figure 3:
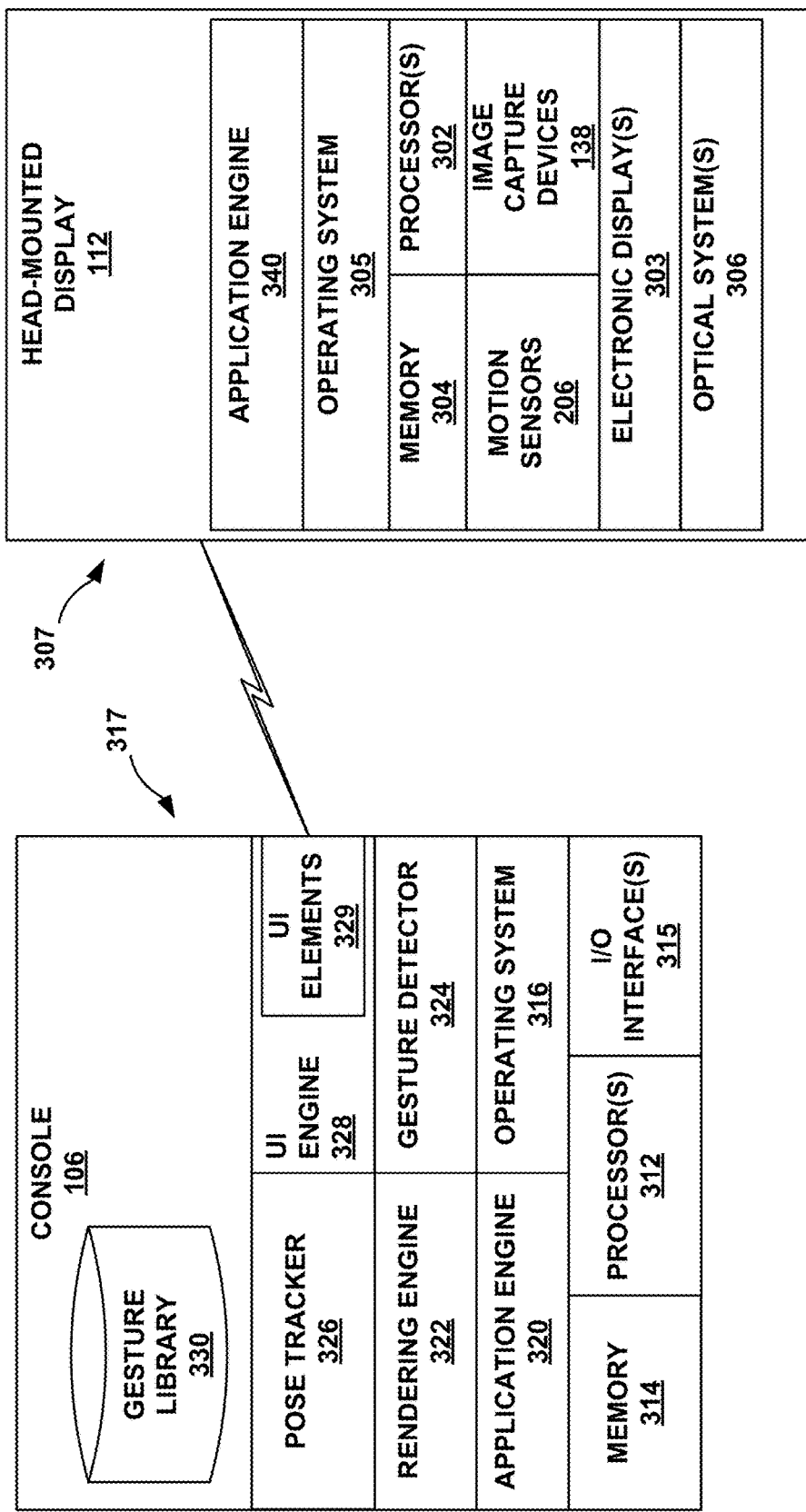
FIG. 3 is a block diagram showing example implementations of a console and an HMD of the artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 303, motion sensors 206, image capture devices 138, and, in some examples, optical system 306. In some examples, processors 302 and memory 304 may be separate, discrete components. In other examples, memory 304 may be on-chip memory collocated with processors 302 within a single integrated circuit.

In some examples, the electronic display 303 may include a projection display, such as a liquid crystal on silicon (LCoS) projector. In accordance with examples disclosed herein, the LCoS projector may include a light source, at least one DT-PBS, an LCoS display, and projection optics to project an image positioned at least partially within the field of view. The at least one DT-PBS may be used as a compact and lightweight system component to direct light from the light source to the LCoS display, e.g. the at least one DT-PBS may be lighter and thinner than current LCoS light directors such as polarizing beam splitters (PBS).

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
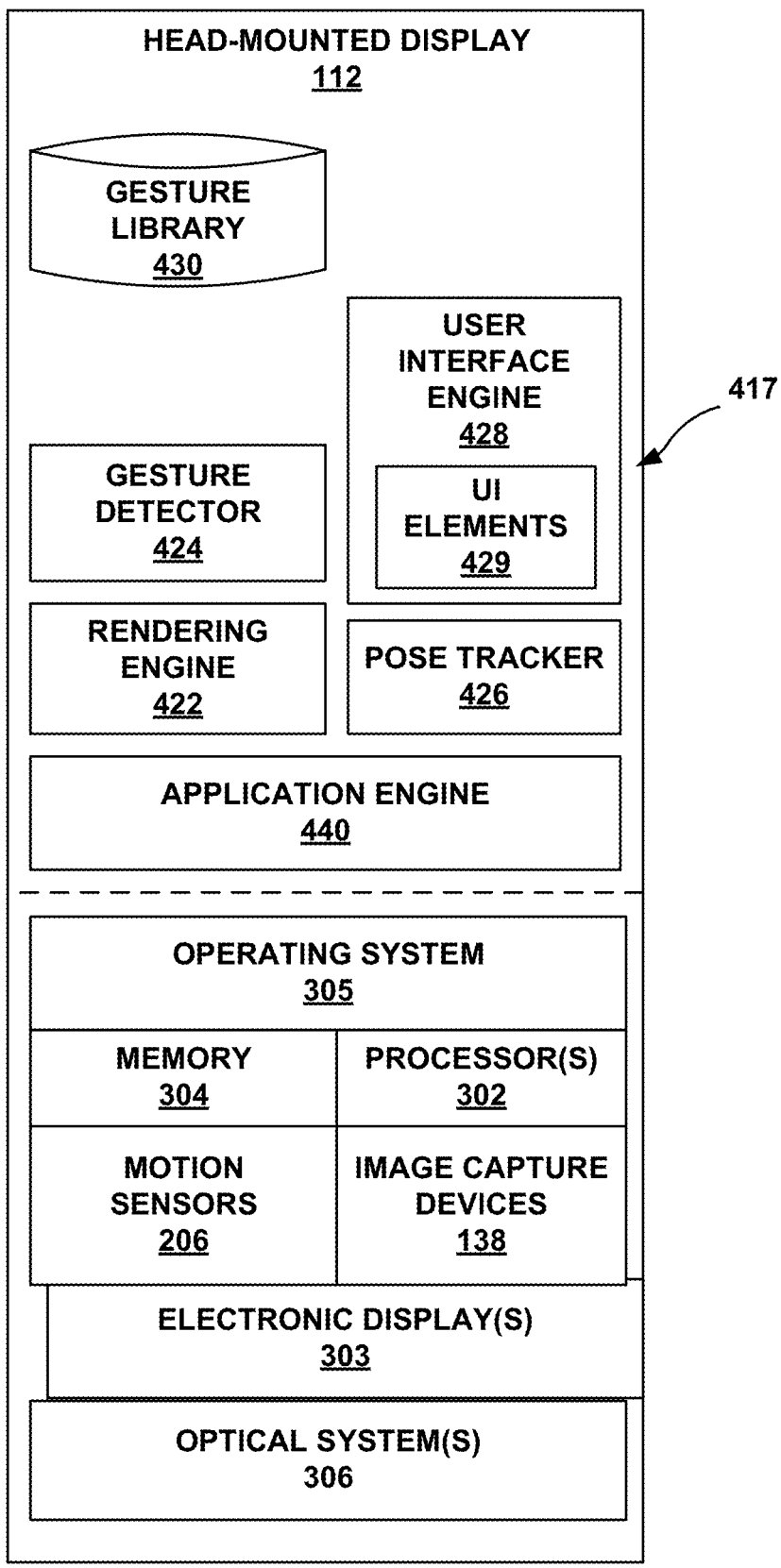
FIG. 4 is a block diagram depicting an example HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 303, varifocal optical system(s) 306, motion sensors 206, and image capture devices 138.

In some examples, the electronic display 303 may include a projection display, such as a liquid crystal on silicon (LCoS) projector. In accordance with examples disclosed herein, the LCoS projector may include a light source, at least one DT-PBS, an LCoS display, and projection optics to project an image positioned at least partially within the field of view. The at least one DT-PBS may be used as a compact and lightweight system component to direct light from the light source to the LCoS display, e.g. the at least one DT-PBS may be lighter and thinner than current LCoS beam splitters such as polarizing beam splitter cubes.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

In examples describe herein, an optical assembly includes DT-PBS that is configured to redirect a first polarization state while directing a second polarization state in a different direction or without redirecting the second polarization state. Optical assemblies utilizing DT-PBS may be used in, for example, an HMD of an artificial reality systems such as HMD 112 of artificial reality system 100. A DT-PBS may polarize and redirect or leave light undirected in several ways, depending on the configuration of the optical assembly.

Figure 5A:
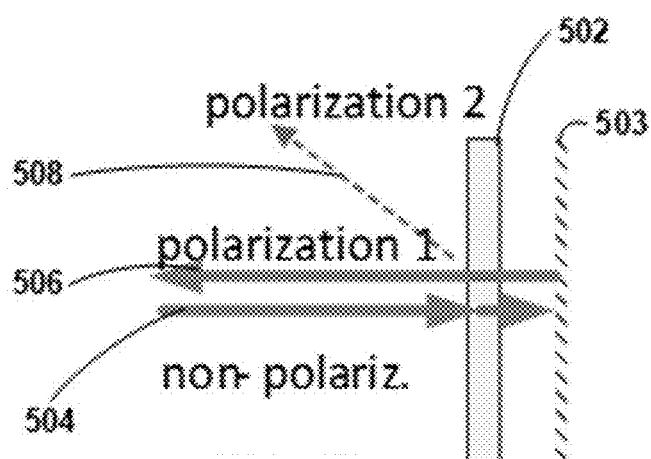
FIGS. 5A-5D are illustrations depicting example diffraction type polarizing beam splitters, in accordance with the techniques described in this disclosure.
Figure 5B:
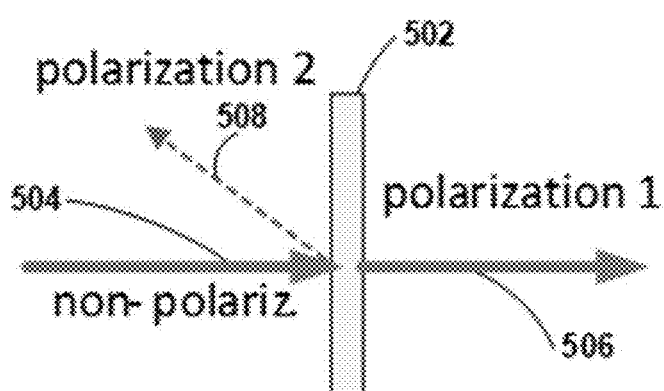
Figure 5C:
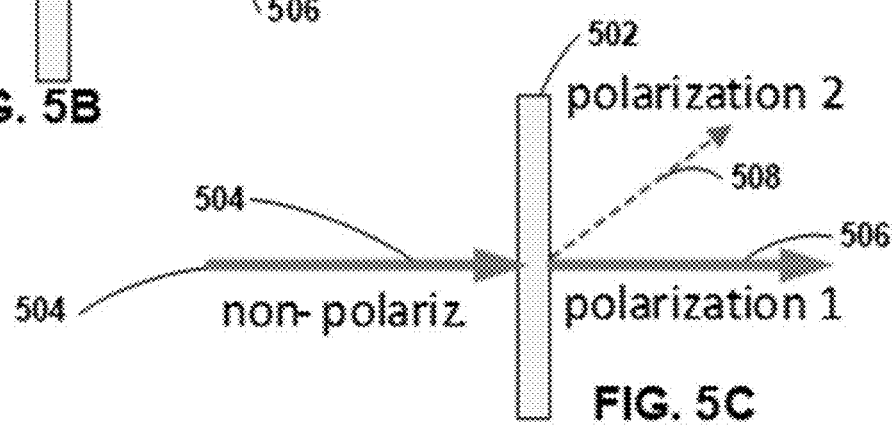

FIGS. 5A-5D are illustrations depicting examples of DT-PBS 502, in accordance with the techniques described in this disclosure. In the examples shown, each of FIGS. 5A-5C illustrate polarization sensitive redirection of light by a DT-PBS 502.

FIG. 5A is an illustration depicting an example DT-PBS 502, in accordance with the techniques described in this disclosure. In the example shown, DT-PBS 502 may be combined with reflector 503, for example, reflector 503 may be a mirror or a cholesteric mirror. In the example shown, unpolarized light 504, e.g. non-polarized or randomly polarized light 504, is incident on a first surface of DT-PBS 502. DT-PBS 502 transmits a first polarization of light 506 without redirection. The transmitted first polarization of light 506 then reflects from reflector 503 without redirection, for example, first polarization of light 506 is reflected such that the reflected angle is of the same magnitude as the incidence angle with respect to the surface normal of reflector 503 (e.g., angle "i" equals angle "r"). In the example shown, randomly polarized light 504 is normally incident, and light having the first polarization, e.g., first polarization of light 506, is reflected normally from reflector 503 in the opposite direction of randomly polarized light 504. DT-PBS 502 reflects a second polarization of light 508 with redirection, for example, second polarization of light 508 is reflected such that the reflected angle is of different magnitude as the incidence angle with respect to the surface normal of polarization sensitive light director 502 (e.g. angle "i" does not equal angle "r"). In other words, DT-PBS 502 in combination with reflector 503 may be a reflective polarization sensitive diffraction grating that reflects a first polarization without diffraction and both reflects and deflects a second polarization of light. In some examples, reflector 503 may be a mirror. For example, for linear first polarization of light 506, reflector 503 may be a mirror and not change the polarization of first polarization of light 506, e.g., via a phase change upon reflection. In some examples, reflector 503 may be a cholesteric mirror. For example, for circular first polarization of light 506, reflector 503 may be a cholesteric mirror configured to preserve the polarization of first polarization of light 506 after reflection, e.g., to preserve right-handed circular incident first polarization of light 506 as right-handed circular first polarization of light 506 after reflection, or to preserve right-handed circular incident first polarization of light 506 as right-handed circular first polarization of light 506 after reflection. Reflector 503 as a cholesteric mirror may preserve polarization, for example, by compensating for a phase change of incident first polarization of light 506 upon reflection.

In some examples, polarization sensitive light director 502 may be a thin, light-weight optical elements such as a PVG, a liquid crystal filled surface relief grating (LC SRG), a holographic polymer dispersed liquid crystal gratings (PDLC), a PBP grating, or any other optic that can selectively transmit one polarization while directing a second polarization state in a different direction or without redirecting the second polarization state.

FIG. 5B is an illustration depicting an example DT-PBS 502, in accordance with the techniques described in this disclosure. In the example shown, unpolarized light 504, e.g. non-polarized or randomly polarized light 504, is incident on a first surface of DT-PBS 502. DT-PBS 502 splits light in two orthogonal polarizations. A first polarization of light 506 is transmitted without redirection, while a second polarization of light 508 is reflected with redirection. In other words, DT-PBS 502 may act as a reflective diffraction grating for a second polarization of light. In some examples, DT-PBS 502 may transmit and redirect a portion of the second polarization of light in addition to reflecting and redirecting the second polarization of light.

FIG. 5C is an illustration depicting an example DT-PBS 502, in accordance with the techniques described in this disclosure. In the example shown, unpolarized light 504, e.g. non-polarized or randomly polarized light 504, is incident on a first surface of DT-PBS 502. DT-PBS 502 splits light in two orthogonal polarizations. DT-PBS 502 transmits a first polarization of light 506 without redirection and transmits a second polarization of light 508 with redirection, e.g., DT-PBS 502 may act as a polarization sensitive diffraction grating that transmits a first polarization without diffraction and both transmits and diffracts a second polarization of light. In some examples, DT-PBS 502 may reflect and redirect the second polarization of light in addition to transmitting and redirecting the second polarization of light.

Figure 5D:
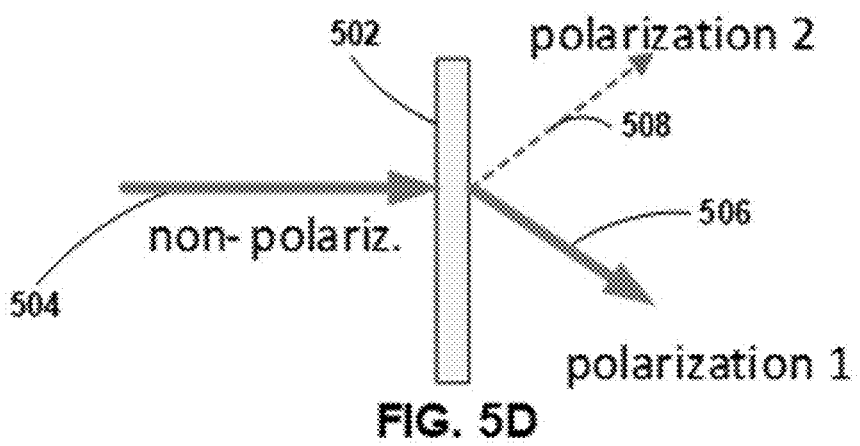

FIG. 5D is an illustration depicting an example DT-PBS 502, in accordance with the techniques described in this disclosure. In the example shown, unpolarized light 504, e.g., non-polarized or randomly polarized light 504, is incident on a first surface of DT-PBS 502. DT-PBS 502 splits light in two orthogonal polarizations. It transmits a first polarization of light 506 with redirection in a first direction and transmits a second polarization of light 508 with redirection in a second direction, e.g., DT-PBS 502 may act as a polarization sensitive diffraction grating that transmits and diffracts orthogonal polarizations in different directions.

In some examples, DT-PBS 502 may be sensitive to linear or circular polarization. For example, DT-PBS 502 may redirect light of a first polarization and not redirect light of a second polarization that is orthogonal to the first polarization.

In some examples, DT-PBS 502 may be sensitive to linear polarization. For example, DT-PBS 502 may be a transmissive or reflective holographic polymer dispersed liquid crystal grating (H-PDLC), such as illustrated and described below with respect to FIGS. 20A-20B. In some examples, DT-PBS 502 may be a liquid crystal filled surface relief grating (LC-SRG), such as illustrated and described below with respect to FIGS. 21A-21B and FIGS. 22A-22B.

In some examples, DT-PBS 502 may be sensitive to circular polarization, for example as a PBP, such as described below with respect to FIGS. 23A-23B. In some examples, polarization sensitive light director 502 may be a reflective or transmissive PVG, such as illustrated and described below with respect to FIGS. 23C-23F.

In some examples, DT-PBS 502 may be a liquid crystal shutter in combination with a passive diffraction grating, such as described below with respect to FIGS. 24-26.

In examples provided herein, an optical assembly utilizing DT-PBS may be used in an HMD of an artificial reality system and may include a display, for example, a LCoS display. In some examples, the LCoS display may function as a spatial light modulator that encodes information in the form of phase and polarization modulation in the incident light directed to the display by a DT-PBS and reflects the spatially modulated light back to the DT-PBS. The latter works as polarizer and transforms spatial modulation of polarization to spatial modulation of amplitude, e.g., an image. In some examples, one or more DT-PBS may replace a conventional PBS in an LCoS projection display system and redirect the spatially modulated light to projection optics in order to display the image encoded by the spatial light modulator.

Figure 6:
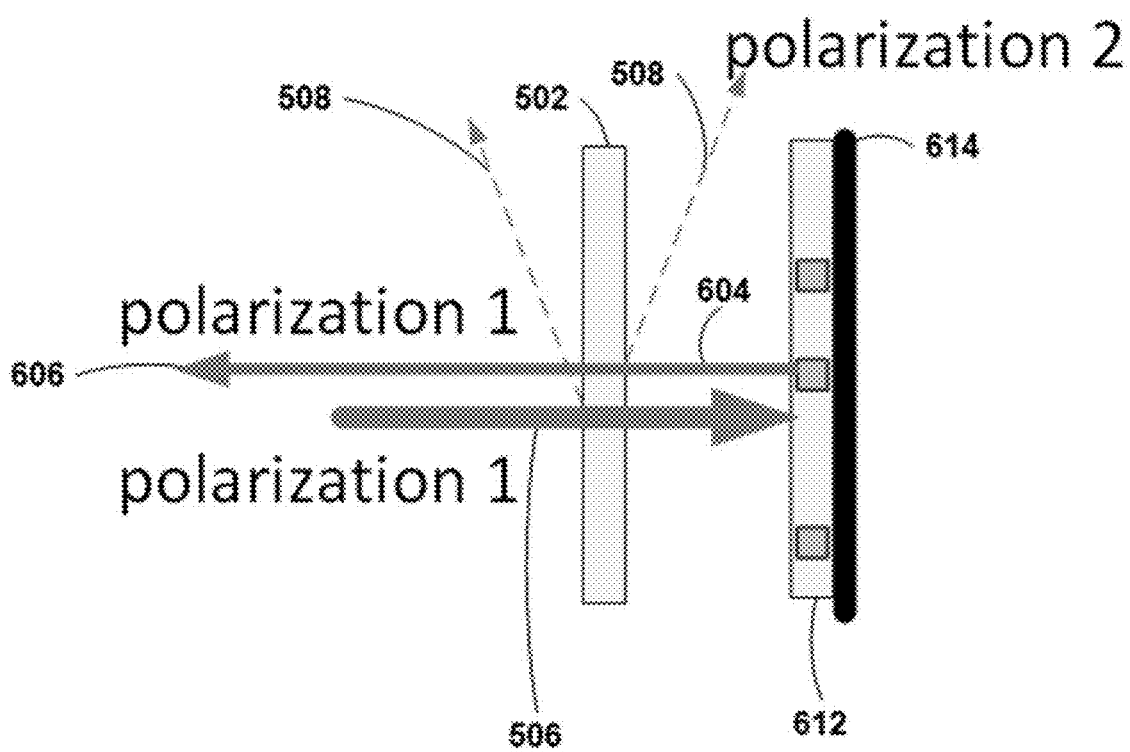
FIG. 6 is an illustration depicting an example diffraction type polarizing beam splitter and spatial light modulator, in accordance with the techniques described in this disclosure.

FIG. 6 is an illustration depicting the working principle of an example LCoS display 612 with an example DT-PBS 502. In the example shown, light of a first polarization 506, is incident on a first surface of DT-PBS 502. DT-PBS 502 transmits the first polarization of light 506 without redirection. The transmitted light having a first polarization 506 may then transmit through spatial light modulator 612, reflect from mirror 614, and transmit once again through spatial light modulator 614 in the opposite direction. The light may have a phase change imparted to it via the spatial light modulator. Accordingly, the polarization state of the light may change after transmission through spatial light modulator 612 and reflection from mirror 614. For example, light 604 in the region between the DT-PBS 502 and spatial light modulator 612 may have components of both the first and second polarization states. In the examples shown, light having the second polarization state 508 may be reflected and redirected by DT-PBS 502, for example, as illustrated and described above with respect to FIG. 5B. In some embodiments, light having the second polarization state 508 may be redirected by DT-PBS 502 via diffraction, e.g., light having the second polarization state 508 may be reflected and diffracted. In the example shown, light having the first polarization 606 exiting spatial light modulator 612 may be transmitted through DT-PBS 502 without redirection. In some examples, light having the first polarization 606 may be spatially modulated in amplitude, phase, and/or polarization state via spatial light modulator 612.

In some examples, the spatial light modulator 612 may comprise a birefringent material. The birefringent material may have different optical thicknesses at different spatial positions in the plane of spatial light modulator 612 that is perpendicular to the surface normal of spatial light modulator 612. Additionally, the birefringent material of spatial light modulator 612 may have a different optical path length for each of the orthogonal components of polarization, e.g., the first polarization state and the second polarization state. For example, the index of refraction for the first polarization state of light, $n_1$ may be different from the index of refraction for the second polarization component of light, $n_2$. The difference between the indices of refraction, $\Delta n$, for the orthogonal first and second polarization states is proportional to the phase delay induced by spatial light modulator 612 between the two components of light with orthogonal polarization. For example, the phase delay between the two orthogonal polarization components of light after having propagated through spatial light modulator 612, reflected from mirror 614, and propagated back through spatial light modulator 612 at a particular spatial position is $\Delta \varphi = 2*(2\pi \Delta nd/\lambda)$, where d is the thickness of spatial light modulator 612 at that position, $\lambda$ is the wavelength of the light, the multiplier "2" is because the light propagates through spatial light modulator 612 twice. By inducing a phase delay between the two components of the incident polarized light, the polarization state of the light may be changed. Because the phase delay depends on the thickness of the material, the wavelength of the light, and birefringence (e.g. $\Delta n$) of the material, either one of or both of the thickness and birefringence may be selected based on the wavelength of light to impart a selected phase delay, for example, to impart a selected change to the polarization state of the light at that particular position of the spatial light modulator 612. As such, the spatial light modulator 612 may control the magnitude of each of the two orthogonal polarization state components exiting spatial light modulator 612, for example, the light 604.

In some examples, spatial light modulator 612 may comprise a liquid crystal display, which may change $\Delta n$ at each pixel (e.g. spatial position) depending upon an applied voltage, e.g., each pixel of spatial light modulator 612 may be tunable. DT-PBS 502 may function as both polarizer (by passing the first polarization state component and reflecting and redirecting the second) and analyzer (again, by passing the first polarization state component and reflecting and redirecting the second). Spatial light modulator 612 and mirror 614 may be combined in a device, for example, as a LCoS display. In other examples, spatial light modulator 612 may comprise an anisotropic film.

In examples provided herein, an optical assembly utilizing a pair of DT-PBS may compensate for dispersion. For example, the redirection of incident light by diffraction may depend on the wavelength of the incident light. Redirection by more than one DT-PBS enables compensation for dispersion by adding the opposite dispersion.

FIGS. 7A-7D are illustrations depicting optical assemblies based on combinations of DT-PBS 502, in accordance with the techniques described in this disclosure. In the examples shown, the optical assemblies may extract and displace and/or redirect one polarization component of light and at least partially compensate for dispersion of the extracted light. In the examples shown, each of FIGS. 7A-7D illustrate respective combinations of two DT-PBS 502 configured to compensate for dispersion resulting from each individual DT-PBS 502. In some examples, a combination of two DT-PBS 502 may allow the use of light sources having broader emission spectra.

FIG. 7A is an illustration depicting an example combination of two DT-PBS 502 retaining the incident light propagation direction, in accordance with the techniques described in this disclosure. In the example shown, broadband light 704 is incident on a first surface of a first DT-PBS 502A. DT-PBS 502A transmits and redirects the light 704 with dispersion, resulting in a wavelength-dependent angular spread of the light. In the examples shown, first DT-PBS 502A disperses the light into light 706A having a maximum wavelength included in the light 704 that is redirected at a maximum angle, light 706C having a minimum wavelength included in the light 704 that is redirected at a minimum angle, and light 706B having a middle wavelength included in the light 704 that is redirected at a middle angle. The spectra of light 706 is then incident on a DT-PBS 502B. DT-PBS 502B transmits and redirects the light 706 with substantially equal and opposite dispersion as compared with DT-PBS 502A. For example, second DT-PBS 502B redirects the light 706A having a maximum wavelength at a maximum angle, light 706C having a minimum wavelength at a minimum angle, and light 706B having a middle wavelength at a middle angle, such that each of light 706A-C are redirected substantially parallel to with respect to each other and parallel to incoming beam 704, as illustrated as broadband light 708. In other words, this assembly provides displacement of incoming beam 704 without changing its direction of propagation. This case, for example, can be realized by using two appropriate gratings with similar properties; two transmissive PVGs operating with circularly polarized light or two LC SRG or two H-PDLC operating with linearly polarized light.

FIG. 7B is an illustration depicting an example combination of two DT-PBS 502 reversing the incident light propagation direction, in accordance with the techniques described in this disclosure. In the example shown, broadband light 704 is incident on a first surface of a first DT-PBS 502A. The DT-PBS 502A reflects and redirects the light 704 with dispersion, resulting in a wavelength-dependent angular spread of the light. In the examples shown, first DT-PBS 502A disperses the light into light 706A having a maximum wavelength included in the light 704 that is redirected at a maximum angle, light 706C having a minimum wavelength included in the light 704 that is redirected at a minimum angle, and light 706B having a middle wavelength included in the light 704 that is redirected at a middle angle. The dispersed light 706 is then incident on a second DT-PBS 502B. The DT-PBS 502B transmits and redirects all spectral components of the dispersed light 706 in the direction opposite to the initial direction of light 704 at the entrance to the DT-PBS assembly. To achieve this, second DT-PBS 502B redirects the light 706A having a maximum wavelength at a maximum angle, light 706C having a minimum wavelength at a minimum angle, and light 706B having a middle wavelength at a middle angle, such that each of light 706A-C are redirected substantially parallel to with respect to each other, as illustrated as broadband light 708. Thus, this assembly provides displacement of incoming beam 704 and changes its propagation direction to the opposite.

FIG. 7C is an illustration depicting an example combination of two DT-PBS 502 retaining the incident light propagation direction, in accordance with the techniques described in this disclosure. In the example shown, broadband light 704 is incident on a first surface of a retaining 502A. DT-PBS 502A reflects and redirects the light 704 with dispersion, resulting in a wavelength-dependent angular spread of the light. In the examples shown, first DT-PBS 502A disperses the light into light 706A having a maximum wavelength included in the light 704 that is redirected at a maximum angle, light 706C having a minimum wavelength included in the light 704 that is redirected at a minimum angle, and light 706B having a middle wavelength included in the light 704 that is redirected at a middle angle. The dispersed light 706 is then incident on a second DT-PBS 502B. The DT-PBS 502B reflects and redirects the light 706 with substantially the same magnitude of dispersion. For example, second polarization sensitive light director 502B redirects the light 706A having a maximum wavelength at a maximum angle, light 706C having a minimum wavelength at a minimum angle, and light 706B having a middle wavelength at a middle angle, such that each of light 706A-C are redirected substantially parallel to with respect to each other, so that all spectral components are parallel and combined in one beam illustrated as broadband light 708.

FIG. 7D is an illustration depicting an example combination of two DT-PBS 502 displacing and reversing the incident light propagation direction, in accordance with the techniques described in this disclosure. In the example shown, broadband light 704 is incident on a first DT-PBS 502A. The DT-PBS 502A transmits and redirects the light 704 with dispersion, resulting in a wavelength-dependent angular spread of the light. In the examples shown, first DT-PBS 502A disperses the light into light 706A having a maximum wavelength included in the light 704 that is redirected at a maximum angle, light 706C having a minimum wavelength included in the light 704 that is redirected at a minimum angle, and light 706B having a middle wavelength included in the light 704 that is redirected at a middle angle. The spectra of light 706 is then incident on a second DT-PBS 502B. The DT-PBS 502B reflects and redirects the light 706 with substantially the same magnitude of dispersion. For example, second DT-PBS 502B redirects the light 706A having a maximum wavelength at a maximum angle, light 706C having a minimum wavelength at a minimum angle, and light 706B having a middle wavelength at a middle angle, such that each of light 706A-C are redirected substantially parallel to with respect to each other, as illustrated as broadband light 708. Thus, this assembly, same as the assembly shown in FIG. 7B, provides displacement of incoming beam 704 and change of its propagation direction to the opposite.

In examples provided herein, an optical assembly utilizing polarization sensitive light directors may be used in an HMD of an artificial reality system, an augmented reality system, a virtual reality system, and/or a mixed reality system, and may include a display, for example, a LCoS display, two or more DT-PBS, and a waveguide, for example, window 203 as illustrated and described above with respect to FIGS. 2A and 2B. In general, optical assemblies utilizing DT-PBS may enable multiple configurations, for example, DT-PBS configured as reflect-transmit, transmit-transmit, reflect-reflect, and transmit-reflect, as illustrated and described below with respect to FIGS. 8-11.

Figure 8:
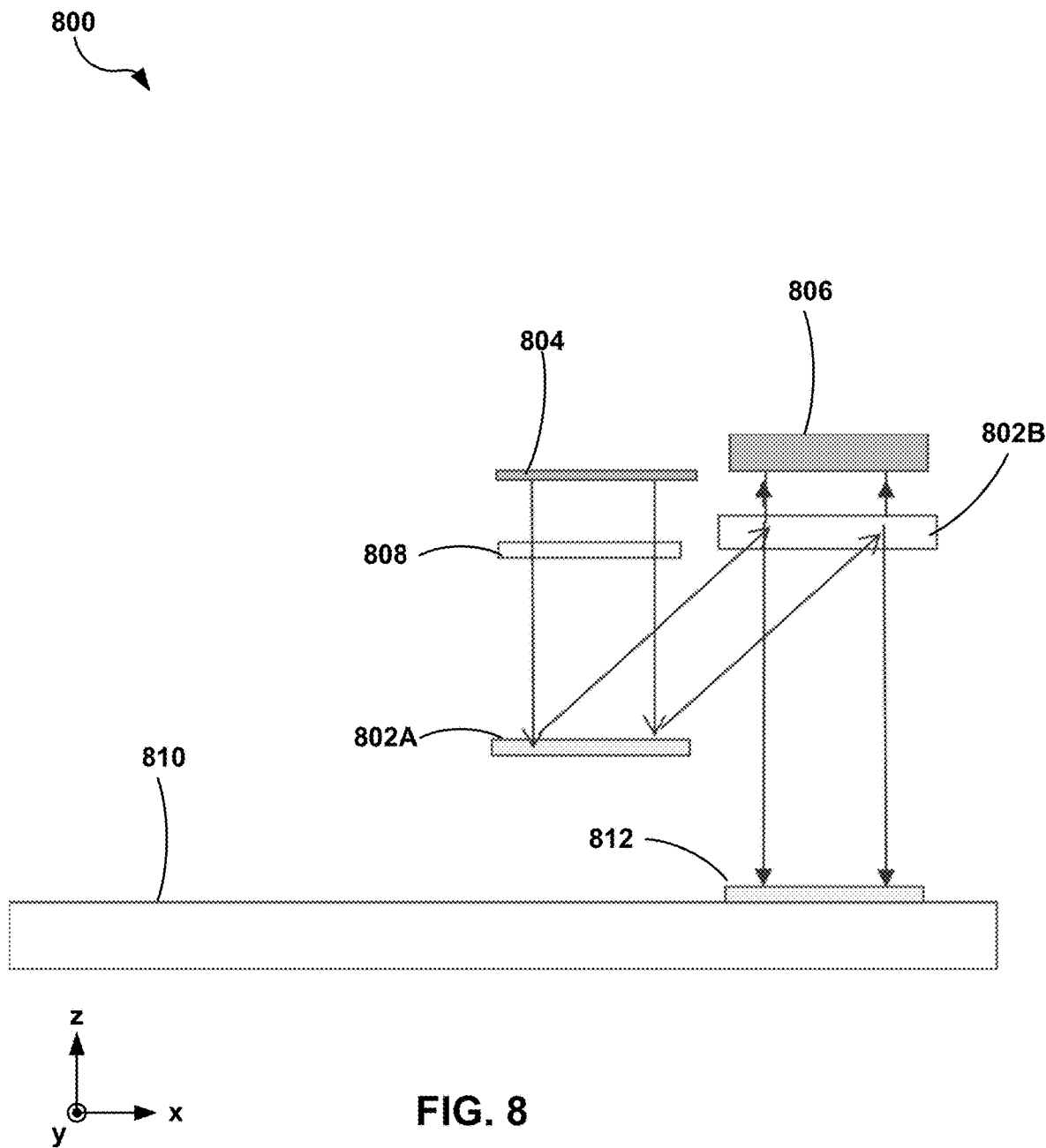
FIG. 8 is an illustration depicting an example display system, in accordance with the techniques described in this disclosure.

FIG. 8 is an illustration depicting an example display system 800, in accordance with the techniques described in this disclosure. The example display system 800 includes two DT-PBS 802A and 802B, a light source 804, and a display 806, for example, an LCoS display 806. In some examples, display system 800 may include a polarizer 808, for example, a linear or circular polarizer 808, an optical combiner 810, and a waveguide input coupler 812. In some examples, display system 800 may include projection optics to reimage the image content of display 806 with or without magnification (not shown).

In the example shown, light source 804 may be an area light source. In some examples, light source 804 may include a plurality of smaller sources, for example, light emitting diodes or lasers. In some examples, light source 804 may be a point-like light source. In some examples, light from light source 802 may include a broad range of wavelengths (e.g., broadband), may include a narrow band of wavelengths, may be monochromatic, or may include any combination of broadband, narrowband, and/or monochromatic light sources. In the example shown, light from light source 804 may be broadband, unpolarized, and directed towards a first DT-PBS 802A. In some examples, polarizer 808 is positioned between light source 804 and first DT-PBS 802A and is configured to select a first polarization, for example, by transmitting (e.g., "passing") a first polarization and not transmitting a second polarization orthogonal to the first polarization (e.g., "blocking" or "filtering out" the second polarization). Alternatively, the first polarization can be extracted from non-polarized light illuminated from source 804 by DT-PBS 802A, e.g., polarizer 808 may be omitted. In some examples, light source 804 may be polarized, and polarizer 808 may be omitted.

In the example shown, first DT-PBS 802A may be a reflective DT-PBS. For example, light may be both reflected and deflected, e.g. reflected at an angle other than the incident angle with opposite sign as in reflection via a mirror. First DT-PBS 802A may be sensitive to circular or linear polarization, for example, the DT-PBS based on PVG and H-PDLC, respectively. In some examples, first DT-PBS 802A is configured to both reflect and redirect light of the first polarization transmitted (e.g., passed) through polarizer 808 towards second polarization sensitive light director 802B. In some examples, first DT-PBS 802A is configured to both reflect and redirect light of the first polarization transmitted (e.g., passed) through polarizer 808 towards second polarization sensitive light director 802B, and additionally to convert the first polarization to a second polarization, e.g. a second polarization orthogonal to the first polarization.

In the example shown, second DT-PBS 802B is positioned in the light path substantially between first DT-PBS 802A and display 806. In the examples shown, second DT-PBS 802B transmits and redirects incident light towards display 808. In the example shown, second DT-PBS 802B may be a transmissive DT-PBS. For example, light may be both transmitted and redirected, e.g., transmitted at an angle other than the incident angle as in transmission through a window. Second DT-PBS 802B may be any DT-PBS, for example, any of the DT-PBS discussed above such as a H-PDLC, a PVG, etc. First DT-PBS 802A and second DT-PBS 802B are selected to be sensitive to the same type of polarization of light (e.g., both sensitive to circular polarization or both sensitive to linear polarization). In some examples, second DT-PBS 802B is configured to both transmit and redirect light of the first polarization towards display 808. In some examples, second DT-PBS 802B is configured to both transmit and redirect light of the second polarization towards display 808. In some examples, second polarization sensitive light director 802B is additionally configured to convert either of a first or second polarization to an orthogonal polarization, e.g., to convert a first polarization to a second polarization or to convert a second polarization to a first polarization. In general, first polarization sensitive light director 802A and second polarization light director 802B are configured to work in conjunction to redirect light of the appropriate polarization for display 808.

In the example shown, display 808 may be any type of display, for example, an LCoS display 808. The display 808 may include both a reflector, such as a silicon backplane, and a spatial light modulator, such as pixelized LC layer of an LCoS device. Display 808 may modulate the phase and/or amplitude of incident light. The phase and polarization of the light exiting the display 808 may be spatially modulated owing to electrically set LC orientation in each pixel. This light passing through the DT-PBS 802B, e.g., in the opposite direction and from display 808, is split in two orthogonal polarizations by DT-PBS 802B and only one polarization is transmitted, e.g., directed, towards a target, e.g., optical combiner 810, such as a waveguide. The amplitude of this light is spatially modulated and as such contains image information perceived by a viewer's eye. In other words, DT-PBS 802B may additionally convert a spatial modulation of polarization light from display 808 to a spatial modulation of amplitude of light. In some examples, DT-PBS 802A and DT-PBS 802B direct, redirect, or are sensitive to the same type of polarization, e.g., circular or linear polarization. In some examples, DT-PBS 802A and DT-PBS 802B may have substantially the same grating period and may be configured to compensate for dispersion.

In the example shown, the spatially modulated light may then be incident on a waveguide input coupler 812, coupling the spatially modulated light into waveguide 810 for transport and output coupling at a desired location.

In general, the example display system 800 includes a reflective DT-PBS 802A and a transmissive DT-PBS 802B. In some examples, the display system 800 may allow for a more compact optical display system, and/or a display system having an alternative form factor that eases and/or improves packaging of the optical display system.

Figure 9:
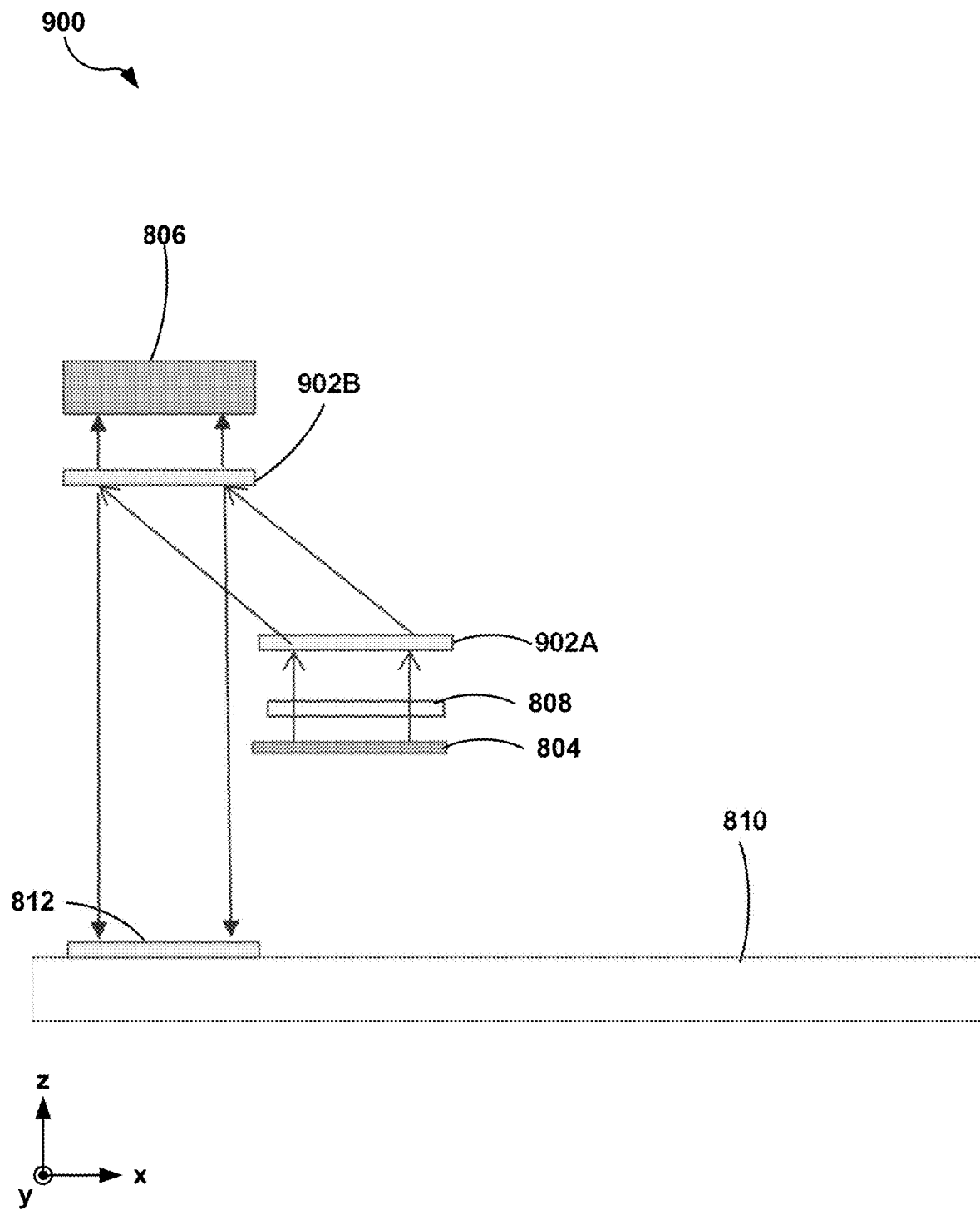
FIG. 9 is an illustration depicting an example display system, in accordance with the techniques described in this disclosure.

FIG. 9 is an illustration depicting an example display system 900, in accordance with the techniques described in this disclosure. The example display system 900 includes two DT-PBS 902A and 902B, a light source 804, and a display 806, for example, an LCoS display 806. In some examples, display system 900 may include a polarizer 808, for example, a linear or circular polarizer 808, an optical combiner 810, and a waveguide input coupler 812. In some examples, display system 900 may include projection optics to reimage the image content of display 806 with or without magnification (not shown). The example display system 900 includes two transmissive DT-PBS 902A and 902B. DT-PBS 902A and 902B are sensitive to the same kind of polarization (linear or circular). In some examples, the display system 900 may allow for a more compact optical display system, and/or a display system having an alternative form factor that eases and/or improves packaging of the optical display system.

In the example shown, light source 804, display 806, and polarizer 808 may be similar to or substantially the same as light source 804, display 806, and polarizer 808 illustrated and described above with reference to FIG. 8. Additionally, in some implementations, polarizer 808 may be omitted, as described with reference to FIG. 8.

In the example shown, first DT-PBS 902A may be a transmissive DT-PBS, such as described above with respect to DT-PBS 802B of FIG. 8. In the example shown, first DT-PBS 902A is configured to both transmit and redirect light of the selected polarization towards second DT-PBS 902B. In some examples, first DT-PBS 902A may additionally be configured to convert the selected polarization state to a different polarization state, e.g. the orthogonal polarization state.

In the example shown, second DT-PBS 902B is positioned in the light path substantially between first DT-PBS 902A and display 806 and may be a transmissive DT-PBS. Second DT-PBS 902B is configured to both transmit and redirect light of the appropriate polarization towards display 808 as described above with respect to FIG. 8.

In the example shown, the light reflected from LCoS with spatially modulated phase and/or polarization, may enter the second DT-PBS 902B again. In this case, the second DT-PBS 902B splits the incident light in two orthogonal polarizations: the earlier preselected polarization component with spatially modulated amplitude is transmitted and directed towards a target, e.g., optical combiner 810, such as a waveguide, whereas the light of additional (orthogonal) polarization is redirected in a different direction. In other words, DT-PBS 902B may additionally convert a spatial modulation of polarization light from display 808 to a spatial modulation of amplitude of light. In some examples, DT-PBS 902A and DT-PBS 902B direct, redirect, or are sensitive to the same type of polarization, e.g., circular or linear polarization. In some examples, DT-PBS 902A and DT-PBS 902B may have substantially the same grating period and may be configured to compensate for dispersion.

Figure 10:
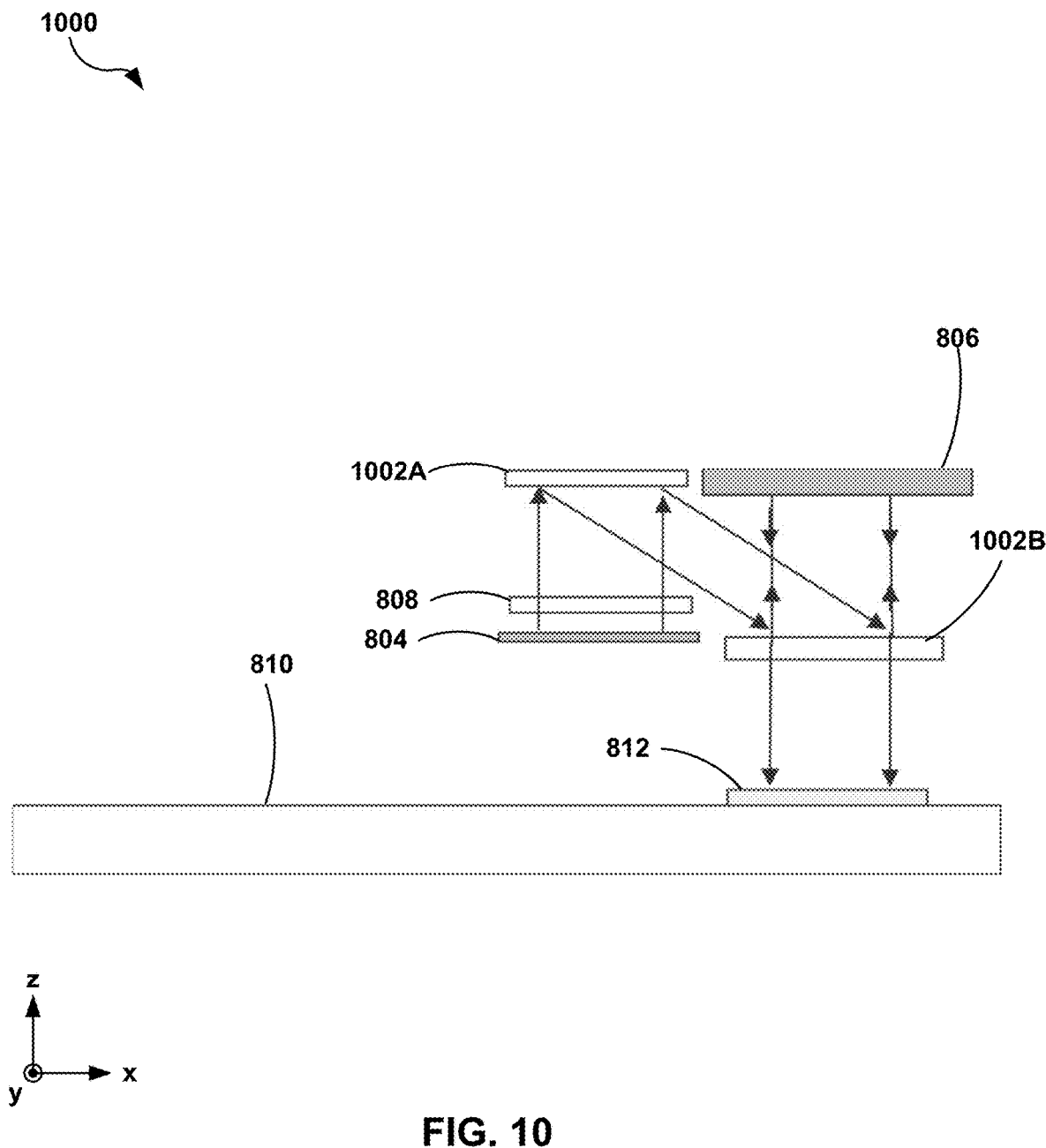
FIG. 10 is an illustration depicting an example display system, in accordance with the techniques described in this disclosure.

FIG. 10 is an illustration depicting an example display system 1000, in accordance with the techniques described in this disclosure. The example display system 1000 includes two DT-PBS 1002A and 1002B, a light source 804, and a display 806, for example, an LCoS display 806. In some examples, display system 1000 may include a polarizer 808, for example, a linear or circular polarizer 808, an optical combiner 810, and a waveguide input coupler 812. As described above, in some instances, polarizer 808 may be omitted. In some examples, display system 1000 may include projection optics to reimage the image content of display 806 with or without magnification (not shown). The example display system 1000 includes two reflective DT-PBS 1002A and 1002B. In some examples, the display system 1000 may allow for a more compact optical display system, and/or a display system having an alternative form factor that eases and/or improves packaging of the optical display system.

In the example shown, light source 804, display 806, and polarizer 808 may be similar to or substantially the same as light source 804, display 806, and polarizer 808 illustrated and described above with reference to FIG. 8.

In the example shown, first DT-PBS 1002A may be a reflective polarization sensitive light director, such as described above with respect to FIG. 8. In the example shown, first DT-PBS 1002A is configured to both reflect and redirect light of the selected polarization towards second DT-PBS 1002B. In some examples, first DT-PBS 1002A may additionally be configured to convert the selected polarization state to a different polarization state, e.g. the orthogonal polarization state.

In the example shown, second polarization sensitive light director 1002B is positioned in the light path substantially between first polarization sensitive light director 1002A and display 806, and may be a reflective DT-PBS, such as described above with respect to FIG. 8. Second DT-PBS 1002B is configured to both transmit and redirect light of the appropriate polarization towards display 808 as described above with respect to FIG. 8.

In the example shown, the light reflected from LCoS with spatially modulated phase and/or polarization, may be incident on the second DT-PBS 1002B again. In this case, the second DT-PBS 1002B splits the incident light in two orthogonal polarizations: the earlier preselected polarization component with spatially modulated amplitude is transmitted and directed towards a target, e.g., optical combiner 810, such as a waveguide, whereas the light of additional (or-thogonal) polarization is reflected and redirected in a different direction. In other words, DT-PBS 1002B may additionally convert a spatial modulation of polarization light from display 808 to a spatial modulation of amplitude of light. In some examples, DT-PBS 1002A and DT-PBS 1002B direct, redirect, or are sensitive to the same type of polarization, e.g., circular or linear polarization. In some examples, DT-PBS 1002A and DT-PBS 1002B may have substantially the same grating period and may be configured to compensate for dispersion.

Figure 11:
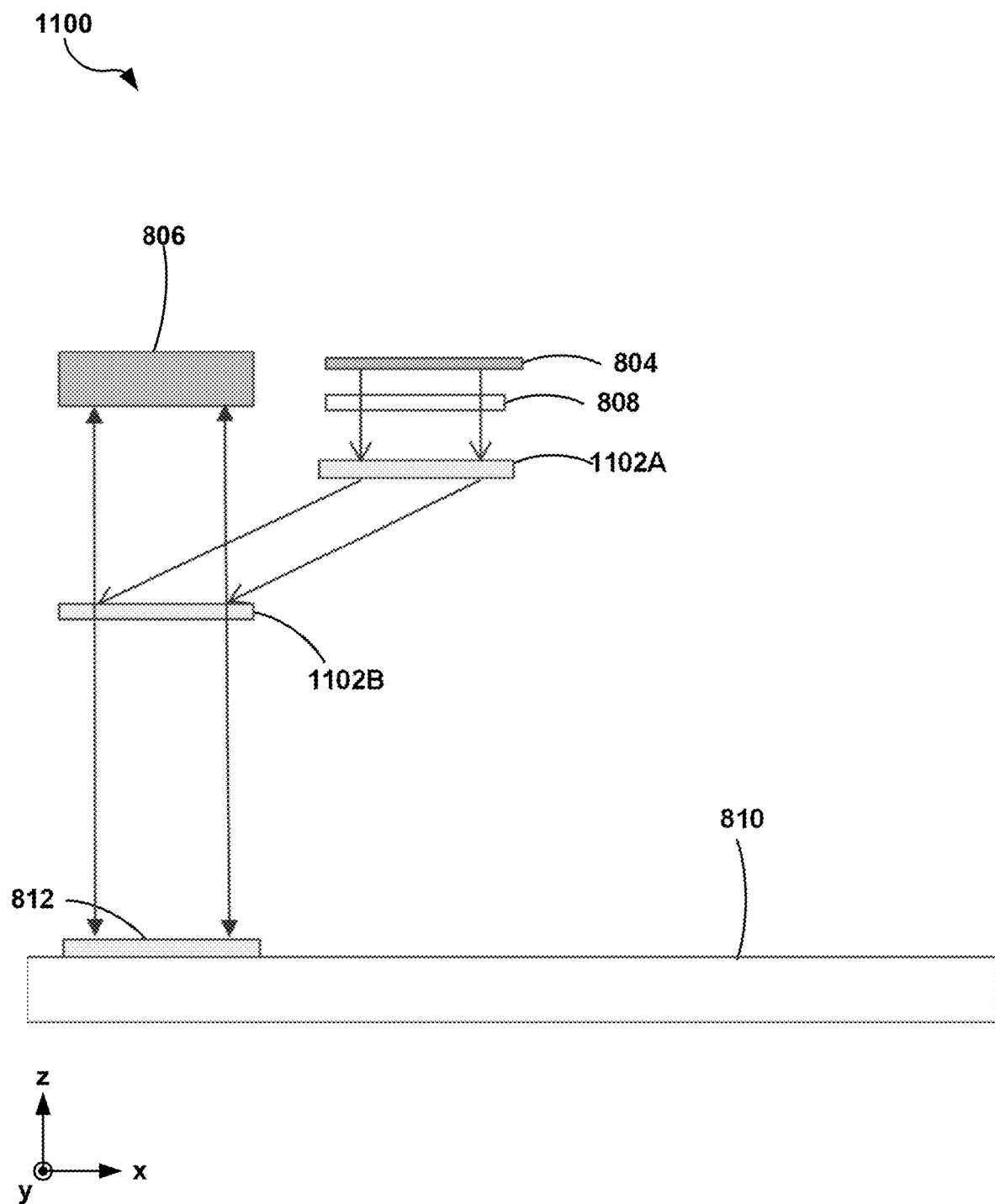
FIG. 11 is an illustration depicting an example display system, in accordance with the techniques described in this disclosure.

FIG. 11 is an illustration depicting an example display system 1100, in accordance with the techniques described in this disclosure. The example display system 1100 includes two DT-PBS 1102A and 1102B, a light source 804, and a display 806, for example, an LCoS display 806. In some examples, display system 1100 may include a polarizer 808, for example, a linear or circular polarizer 808, an optical combiner 810, and a waveguide input coupler 812. As described above, in some instances, polarizer 808 may be omitted. In some examples, display system 1100 may include projection optics to reimage the image content of display 806 with or without magnification (not shown). The example display system 1100 includes two reflective DT-PBS 1102A and 1102B. In some examples, the display system 1100 may allow for a more compact optical display system, and/or a display system having an alternative form factor that eases and/or improves packaging of the optical display system.

In the example shown, light source 804, display 806, and polarizer 808 may be similar to or substantially the same as light source 804, display 806, and polarizer 808 illustrated and described above with reference to FIG. 8.

In the example shown, first polarization sensitive light director 1102A may be a reflective DT-PBS, such as described above with respect to FIG. 8. In the example shown, first DT-PBS 1102A is configured to both reflect and redirect light of the selected polarization towards second DT-PBS 1102B. In some examples, first DT-PBS 1102A may additionally be configured to convert the selected polarization state to a different polarization state, e.g. the orthogonal polarization state.

In the example shown, second DT-PBS 1102B is positioned in the light path substantially between first DT-PBS 1102A and display 806, and may be a reflective DT-PBS, such as described above with respect to DT-PBS 802A of FIG. 8. Second DT-PBS 1102B is configured to both reflect and redirect light of the appropriate polarization towards display 808 as described above with respect to DT-PBS 802A of FIG. 8 and DT-PBS 1002B of FIG. 10.

In the example shown, the light reflected from LCoS with spatially modulated phase and/or polarization, may be incident on the second DT-PBS 1102B again. In this case, the second DT-PBS 1102B splits the incident light in two orthogonal polarizations: the earlier preselected polarization component with spatially modulated amplitude is transmitted and directed towards a target, e.g., optical combiner 810, such as a waveguide, whereas the light of additional (or-thogonal) polarization is redirected in a different direction. In other words, DT-PBS 1102B may additionally convert a spatial modulation of polarization light from display 808 to a spatial modulation of amplitude of light. In some examples, DT-PBS 1102A and DT-PBS 1102B direct, redirect, or are sensitive to the same type of polarization, e.g., circular or linear polarization. In some examples, DT-PBS 1102A and DT-PBS 1102B may have substantially the same grating period and may be configured to compensate for dispersion.

Figure 12:
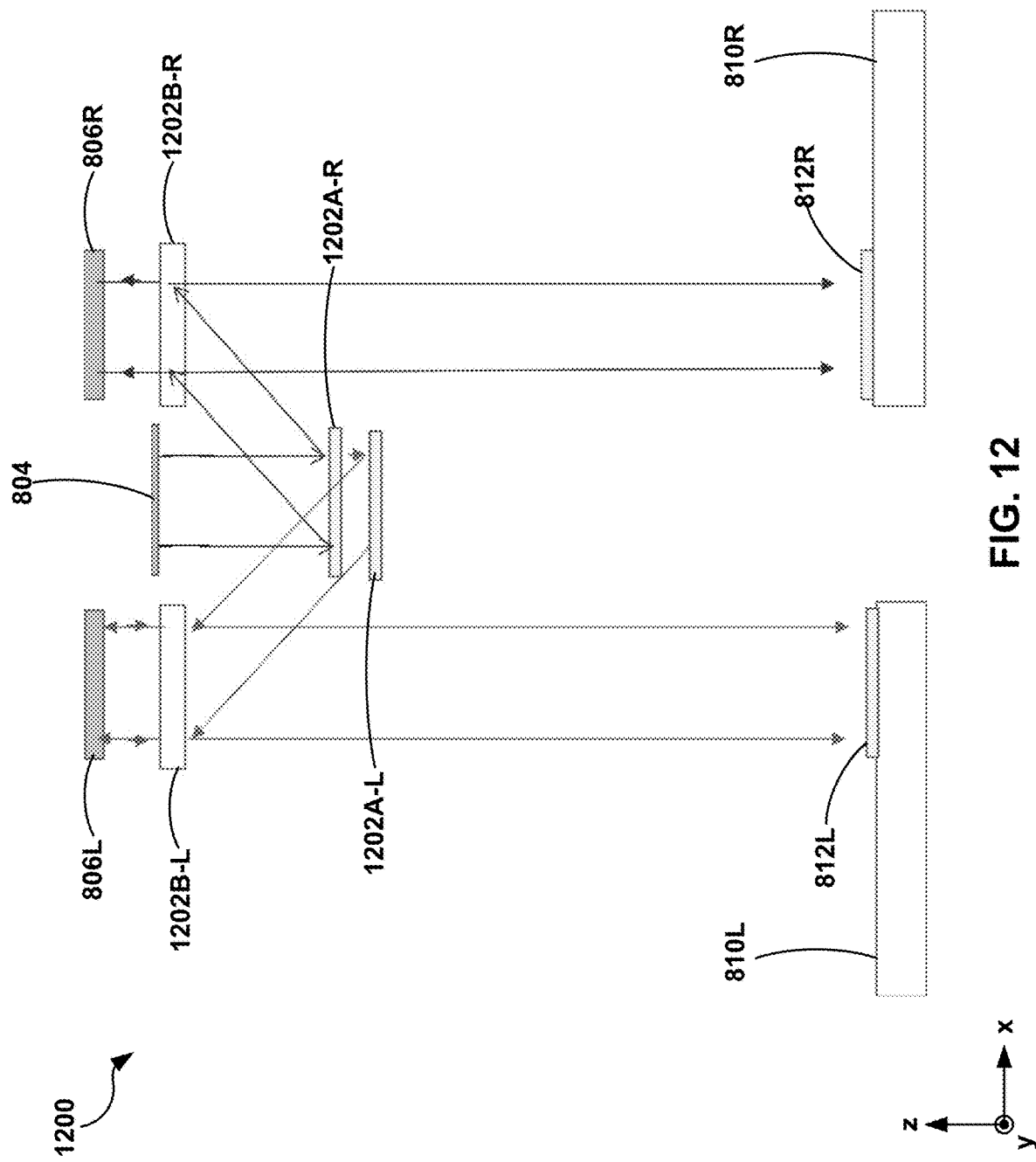
FIG. 12 is an illustration depicting an example display system, in accordance with the techniques described in this disclosure.

In some examples, optical assemblies utilizing DT-PBS may enable additional configurations, for example, to efficiently use the light from the light source by using both orthogonal polarization states for display in a left-eye/right-eye configuration. For example, FIG. 12 is an illustration depicting an example display system 1100, in accordance with the techniques described in this disclosure. The example display system 1100 includes four DT-PBS 1202A-L, 1202B-L, 1202A-R, and 1202B-R, a light source 804, and two displays 806L and 806R, for example, LCoS displays 806L and 806R. In some examples, display system 1200 may include a waveguide 810, and a waveguide input coupler 812. In some examples, display system 1200 may include projection optics to reimage the image content of display 806 with or without magnification (not shown). The example display system 1200 includes two reflective DT-PBS 1202A-L and 1202A-R, and two transmissive DT-PBS 1202B-L and 1202B-R, which may enable projection of virtual content independently to the left and right eyes of a user, for example, for stereoscopic presentation of virtual content. In some examples, the display system 1200 may allow for a more compact optical display system, and/or a display system having an alternative form factor that eases and/or improves packaging of the optical display system. In some examples, display system 1200 may allow for more efficient use of unpolarized light emitted by source 804, e.g., by utilizing both polarization states rather than selecting one and filtering out the other. In some examples, display system 1200 may allow for the use of a single light source 804 for two displays to independently display content to a user's left eye and right eye. In some examples, display system 1200 allow for at least part of the optical assembly for both the left eye and right eye paths to have a common optical axis, for example, the light source and at least two of the polarization sensitive light directors may be aligned via a common optical axis.

In the example shown, light source 804 and displays 806L and 806R may be similar to or substantially the same as light source 804 and display 806 illustrated and described above with reference to FIG. 8.

In the example shown, and in contrast with systems 800-1100, system 1200 does not include a polarizer positioned between light source 804 and first polarization sensitive light director. Instead, the example in system 1200 utilizes two pairs of DT-PBS serving as polarization sensitive light directors, with each pair sensitive to the orthogonal polarization with respect to the other pair. For example, DT-PBS 1202A-L and 1202B-L may be sensitive to a first polarization, e.g. may redirect a first polarization to a user's left eye, while DT-PBS 1202A-R and 1202B-R may be sensitive to a second polarization orthogonal to the first polarization, e.g. may redirect a second polarization to a user's right eye. In some examples, system 1200 may more efficiently use light as compared to a system utilizing a polarizer in between the light source and the first DT-PBS, for example, by using the DT-PBS to both direct a first polarization of light for use by the system and passing a second polarization of light to a second DT-PBS for use by the system. In other words, system 1200 may include DT-PBS to use both polarizations of light emitted by the light source as compared to selecting one polarization via an absorbing linear or circular polarizer located between the light source and the first DT-PBS.

In the example shown, DT-PBS 1202A-R may be a reflective DT-PBS, such as described above with respect to FIG. 8. In the example shown, DT-PBS 1202A-R is configured to both reflect and redirect light of a first polarization towards second DT-PBS 1202B-R. In some examples, DT-PBS 1202A-R may additionally be configured to convert the selected polarization state to a different polarization state, e.g. the orthogonal polarization state. Further, DT-PBS 1202A-R is configured to transmit, e.g., "pass," a second polarization, for example, a second polarization orthogonal to the first polarization.

In the example shown, DT-PBS 1202A-L may be a reflective DT-PBS, such as described above with respect to FIG. 8. In the example shown, DT-PBS 1202A-L is configured to both reflect and redirect light of a second polarization orthogonal to the first polarization reflected and redirected by DT-PBS 1202A-R. In the example shown, DT-PBS 1202A-L is configured to reflect and redirect the second polarization towards second DT-PBS 1202B-R. In some examples, DT-PBS 1202A-R may additionally be configured to convert the selected polarization state to a different polarization state, e.g. the orthogonal polarization state.

In some examples, any of DT-PBS 1202A-L, 1202B-L, 1202A-R, and 1202B-R may convert the polarization of incident light to a different polarization state, e.g. the orthogonal polarization state, and therefore for ease of description, the first polarization reflected and redirected via DT-PBS 1202A-R in the example shown will be referred to as "right-selected" polarization and the polarization orthogonal to the right-selected polarization that is reflected and redirected via DT-PBS 1202A-L will be referred to as "left-selected" polarization.

In the example shown, DT-PBS 1202B-R is positioned in the light path substantially between DT-PBS 1202A-R and display 806R, and may be a transmissive DT-PBS, such as described above with respect to FIG. 8. DT-PBS 1202B-R is configured to both transmit and redirect right-selected polarized light towards display 808R.

In the example shown, DT-PBS 1202B-L is positioned in the light path substantially between DT-PBS 1202A-L and display 806L, and may be a transmissive DT-PBS, such as described above with respect to FIG. 8. DT-PBS 1202B-L is configured to both transmit and redirect left-selected polarized light towards display 808L.

In the example shown, the left- and right-selected light that has spatially modulated phase and/or polarization after reflection from display may be incident on DT-PBS 1202B-L and DT-PBS 1202B-R, respectively, again. After passing through the splitters 1202B-L and 1202B-R the light becomes uniformly polarized and the spatial modulation of polarization is transformed to a spatial modulation of amplitude, which may be perceived by eye as an image. This image light may then be incident on waveguide input couplers 812R and 812L, respectively, thereby coupling the image light into waveguides 810R and 810L, respectively, for transport and output coupling at a desired location and to the right and left eyes, respectively, of the user.

In some examples, display system 1200 may be of any the reflective-transmissive, transmissive-transmissive, reflective-reflective, and reflective-reflective configurations described above with respect to FIGS. 8-11. For example, DT-PBS 1202A-L, 1202B-L, 1202A-R, and 1202B-R may be reflective or transmissive, and may be combined in any of the configurations described above with respect to FIGS. 8-11. Further, the left and right sides may be independently configured, for example, having the same configuration type (e.g. reflective-transmissive) or different configuration types.

In each of FIGS. 8-12, the light source 804 may be a broadband light source, e.g. having a plurality of wavelengths of varying amplitude. Each of DT-PBS 802, 902, 1002, 1102, 1202 may be dispersive, e.g. redirect light in a wavelength-dependent angle. Each of display systems 800, 900, 1000, 1100, and 1200 include at least two coupled DT-PBS, and may compensate for dispersion, for example, as described above with respect to FIGS. 7A-C.

In some examples, optical assemblies utilizing DT-PBS may be configured to increase the contrast of the final displayed image, increase energy efficiency, realize zonal illumination, or combinations thereof. For example, the light source used may be an area source, or an area comprising a plurality of point-like sources, that can selectively change the brightness based on spatial position as described below with respect to FIG. 13. In some examples, one or more of the DT-PBS may be switchable based on spatial position, as described below with respect to FIG. 14. In some examples, the contrast of the displayed image may be increased by locally dimming the light source, or locally selecting the light to be directed to the display via the polarization sensitive light directors, or any combination of the two.

Figure 13:
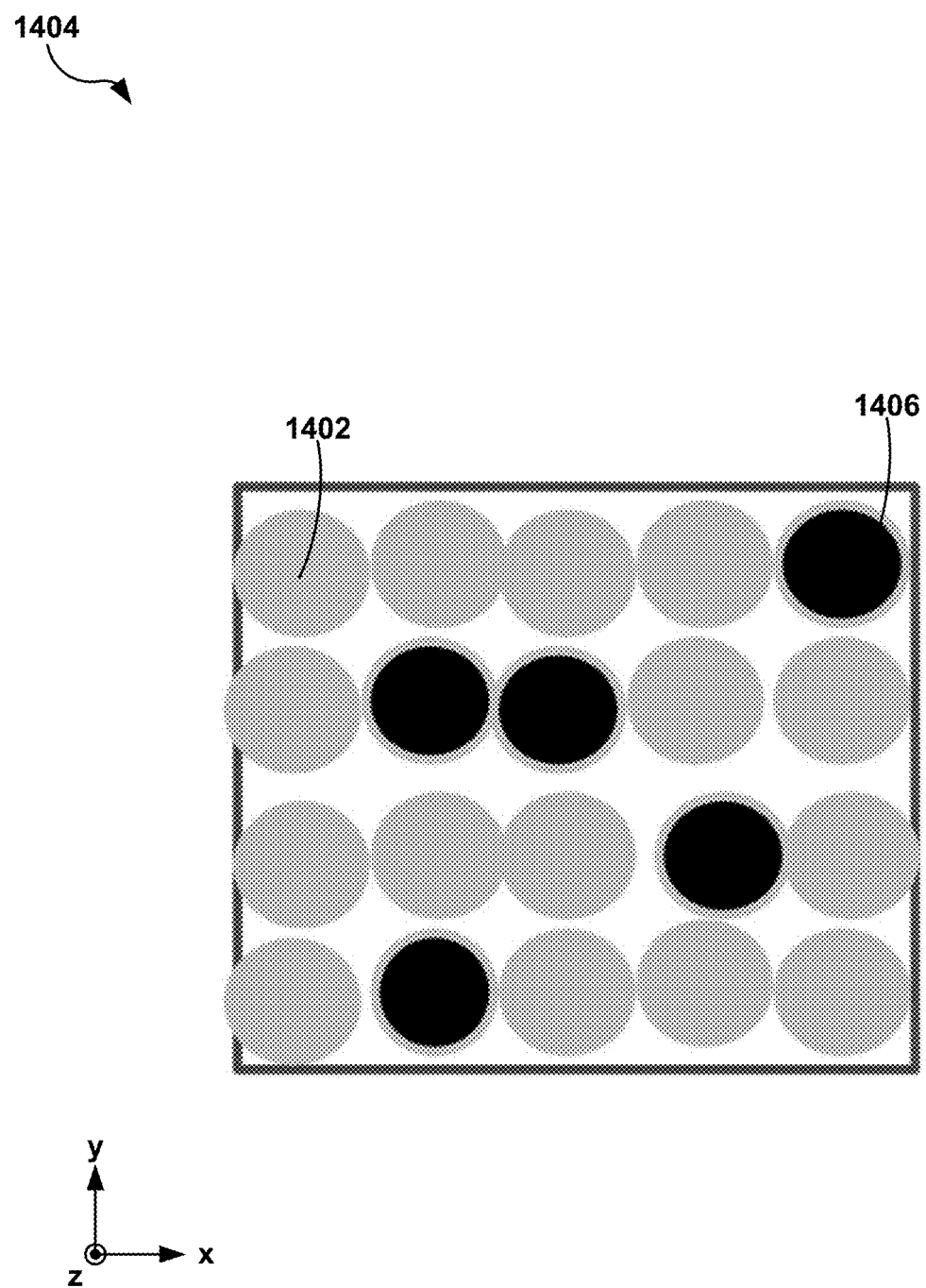
FIG. 13 is an illustration depicting an example light source, in accordance with the techniques described in this disclosure.

FIG. 13 is an illustration depicting an example light source 1404, in accordance with the techniques described in this disclosure. The example light source 1404 includes a plurality of individual point-like sources, e.g. smaller area sources, for example, LEDs, organic light emitting diodes (OLEDs), laser sources, etc. The light source 1404 may be used as light source 804 in any of the preceding figures, e.g., FIGS. 8-12, and FIG. 14 below.

In the example shown, the plurality of individual light sources may be selectively activated. For example, individual light source 1402 is activated and emits light, and individual light source 1406 is not activated and does not emit light. In some examples, selectively activating light sources based on spatial position within light source 1304 may improve the contrast of a display system and/or improve the energy efficiency of a display system, e.g. any of display systems 800, 900, 1000, 1100, and 1200. In some examples, selectively activating light sources based on spatial position within light source 1304 may enable and/or improve zone illumination, e.g., illumination of only a portion of the image at a particular time.

Figure 14:
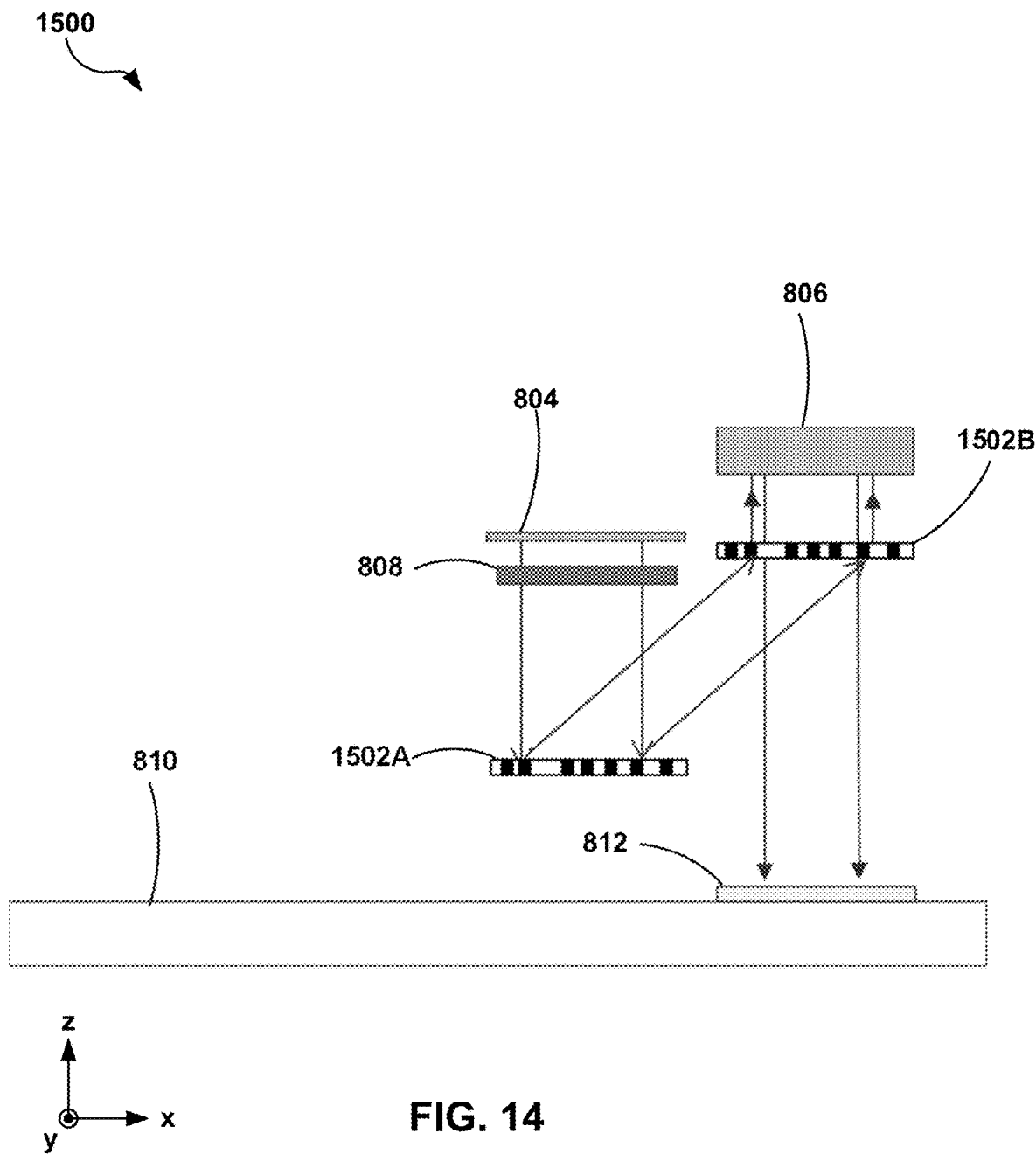
FIG. 14 is an illustration depicting an example display system, in accordance with the techniques described in this disclosure.

FIG. 14 is an illustration depicting an example display system 1500, in accordance with the techniques described in this disclosure. The example display system 1500 is substantially similar to system 800 of FIG. 8, aside from differences described herein. In particular, unlike system 800, system 1500 includes two DT-PBS 1502A and 1502B, at least one of which may be pixelated.

In the example shown, first pixelated DT-PBS 1502A may be configured to be switchable, e.g. electronically controllable. For example, first DT-PBS 1502A may be switched between at least a first state configured to both reflect and redirect light of the selected polarization and at least a second state configured to transmit all light without redirection.

Additionally, first pixelated DT-PBS 1502A may be pixelated, such that pixelated DT-PBS 1502A includes a plurality of switchable portions. For example, first pixelated DT-PBS 1502A may be spatially divided into domains by a transparent electrode configuration such that individual domains are independently switchable. First pixelated DT-PBS 1502A may be a diffraction element based on an electronically switchable birefringent material disposed between two substrates, and the individual domains may be determined by a transparent electrode pattern on a surface of one of the substrates of first pixelated DT-PBS 1502A. The other substrate may have an area transparent conductor, or an opposing transparent electrode pattern, disposed on a surface of the opposing substrate, such that a voltage applied to the electrode pattern results in an electric field pattern established between the electrode pattern and the opposing conductor. The birefringent material may align along or perpendicularly to the field lines, thereby changing the in-plane birefringence (e.g., $\Delta n$) of the material in the local area of each domain of the electrode pattern. As such, first pixelated DT-PBS 1502A may also function as a spatial modulator to spatially modulate intensity of illumination and to enhance contrast of the display system 1500.

In some examples, first pixelated DT-PBS 1502A may be a liquid crystal grating that is directly driven between one or more states, for example, by an electric field between transparent electrodes. In other examples, first DT-PBS 1502A may be a combination of a passive (e.g. non-switchable) polarization sensitive grating and a switchable half-wave plate adjacent to it from the side of light incidence. This plate locally changes the polarization of light passing through it to orthogonal, which is not deflected by DT-PBS 1502A to the second DT-PBS 1502A and then to display. In other examples, first DT-PBS 1502A may be a combination of a passive (e.g. non-switchable) grating and a pixelated shutter adjacent to it from the side of light incidence. The examples of suitable shutters are pixelated birefringence type, guest-host type and scattering type LC shutters illustrated and described below regarding to FIGS. 24, 25 and 26, respectively. In some examples, configuring first DT-PBS 1502A to be switchable may enable spatial control of the light incident on display 806, e.g. spatial amplitude control of the incident light, and may result in contrast enhancement of display system 1500 as well as zone illumination.

In the example shown, second pixelated DT-PBS 1502B is positioned in the light path substantially between first polarization sensitive light director 1502A and display 806, and may be a transmissive DT-PBS, such as described above with respect to FIG. 8. Second pixelated DT-PBS 1502B may be configured to both transmit and redirect light of the appropriate polarization towards display 808 as described above with respect to FIG. 8. In some examples, second pixelated DT-PBS 1502B may be switchable, as described above with respect to first DT-PBS 1502A.

In the example shown, the spatially modulated light may then be incident on a waveguide input coupler 812, coupling the spatially modulated light into waveguide 810 for transport and output coupling at a desired location.

In the example shown, both first DT-PBS 1502A and second DT-PBS 1502B are switchable and pixelated. In some examples, either first or second DT-PBS 1502A and 1502B may be switchable and pixelated, with the other being a passive DT-PBS such as any of DT-PBS 802, 902, 1002, 1102 and/or 1202A described above. In addition, first and second DT-PBS 1502A and 1502B may be used in any combination or configuration, such as the reflective-transmissive, transmissive-transmissive, transmissive-reflective, reflective-reflective, and/or stereoscopic as described above with respect to FIGS. 8-12.

Figure 17:
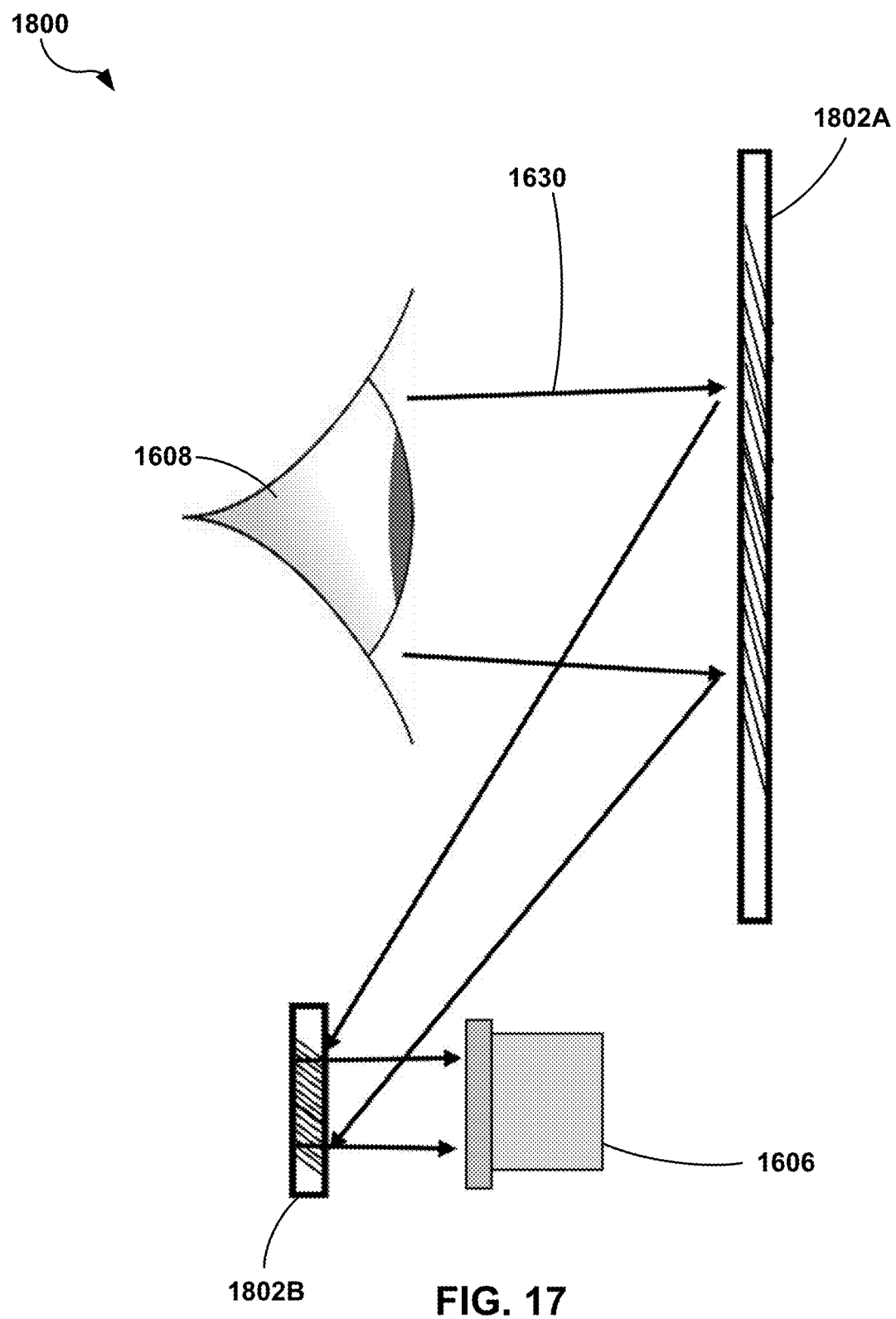
FIG. 17 is an illustration depicting an example eye-tracking system, in accordance with the techniques described in this disclosure.
Figure 18:
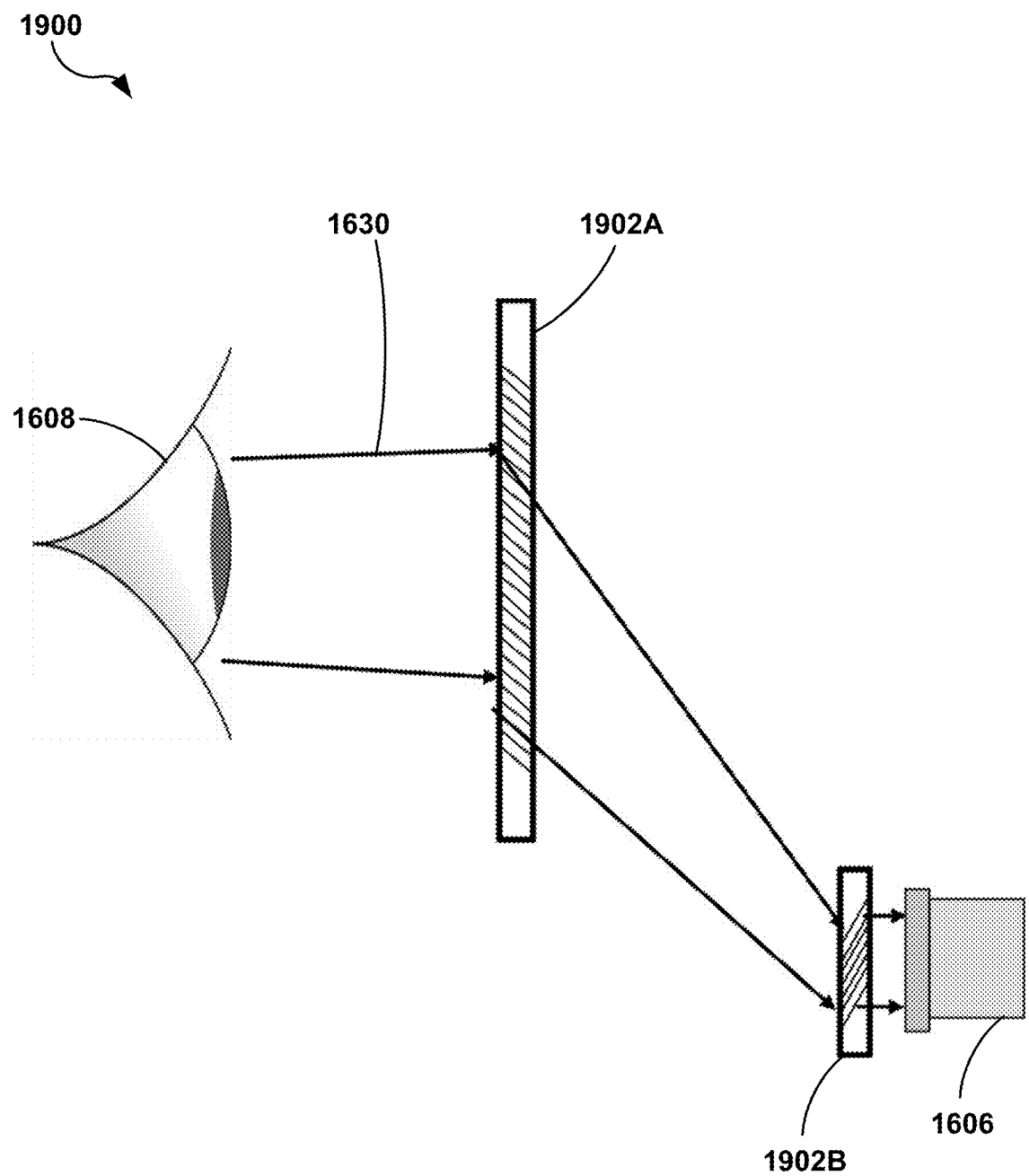
FIG. 18 is an illustration depicting an example eye-tracking system, in accordance with the techniques described in this disclosure.
Figure 19:
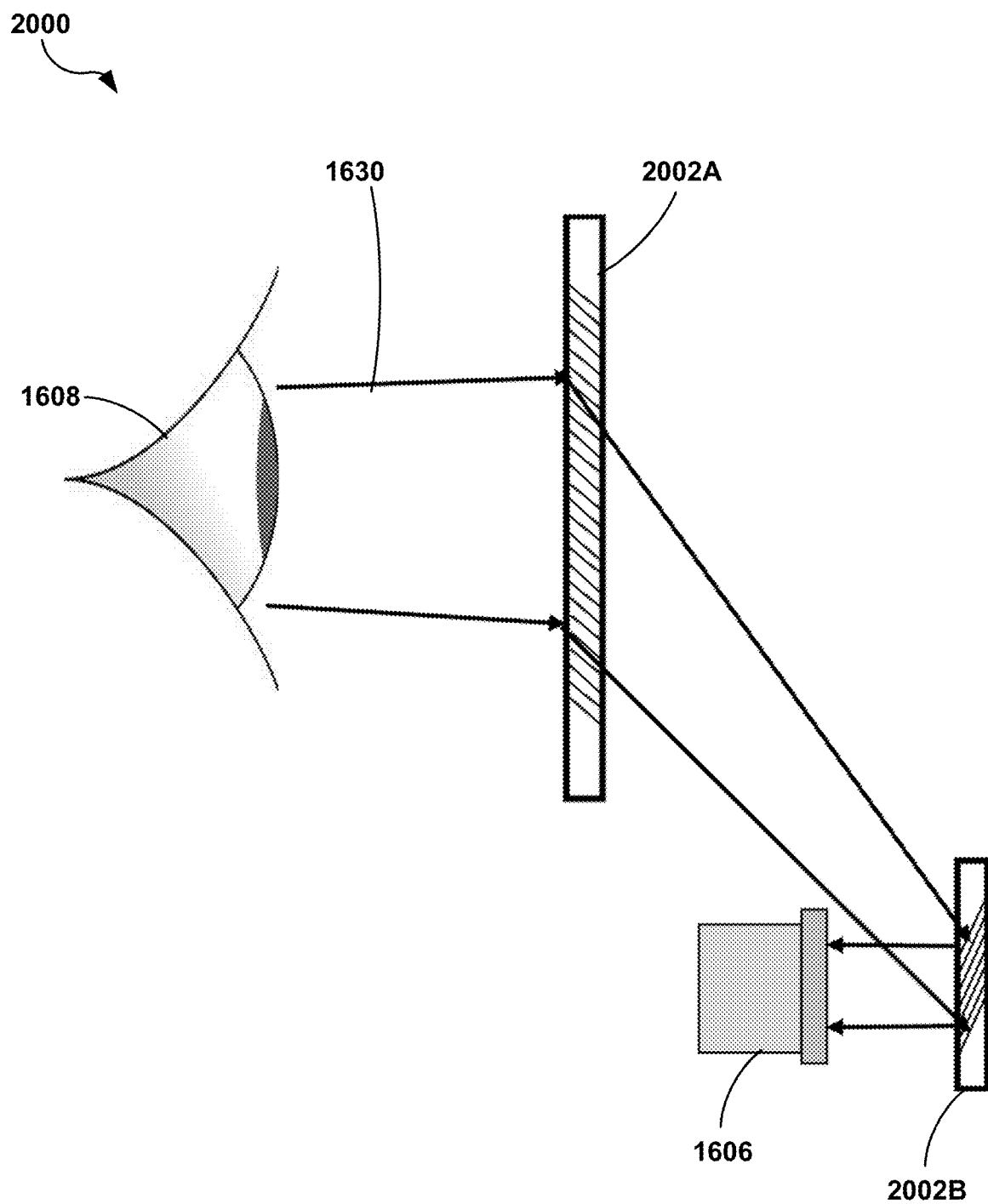
FIG. 19 is an illustration depicting an example eye-tracking system, in accordance with the techniques described in this disclosure.

In some examples, the present disclosure is also directed to an optical assembly for directing light to an eye tracking detector after reflecting off an eye. Polarization sensitive light directors, because they are thin, lightweight, and can compensate for dispersion, enable small form factors and new design solutions, and enable the use of broadband illumination for eye tracking, e.g., LEDs. FIGS. 15-19 below illustrate and describe example optical assemblies for directing light to an eye-tracking camera, e.g. eye-tracking systems, utilizing polarization sensitive light directors. FIGS. 15-18 illustrate examples of light source placement in example eye-tracking systems in a reflective-transmissive polarization sensitive light director configuration, and FIGS. 17-19 illustrate reflective-reflective, transmissive-transmissive, and transmissive-reflective combinations of DT-PBS.

Figure 15:
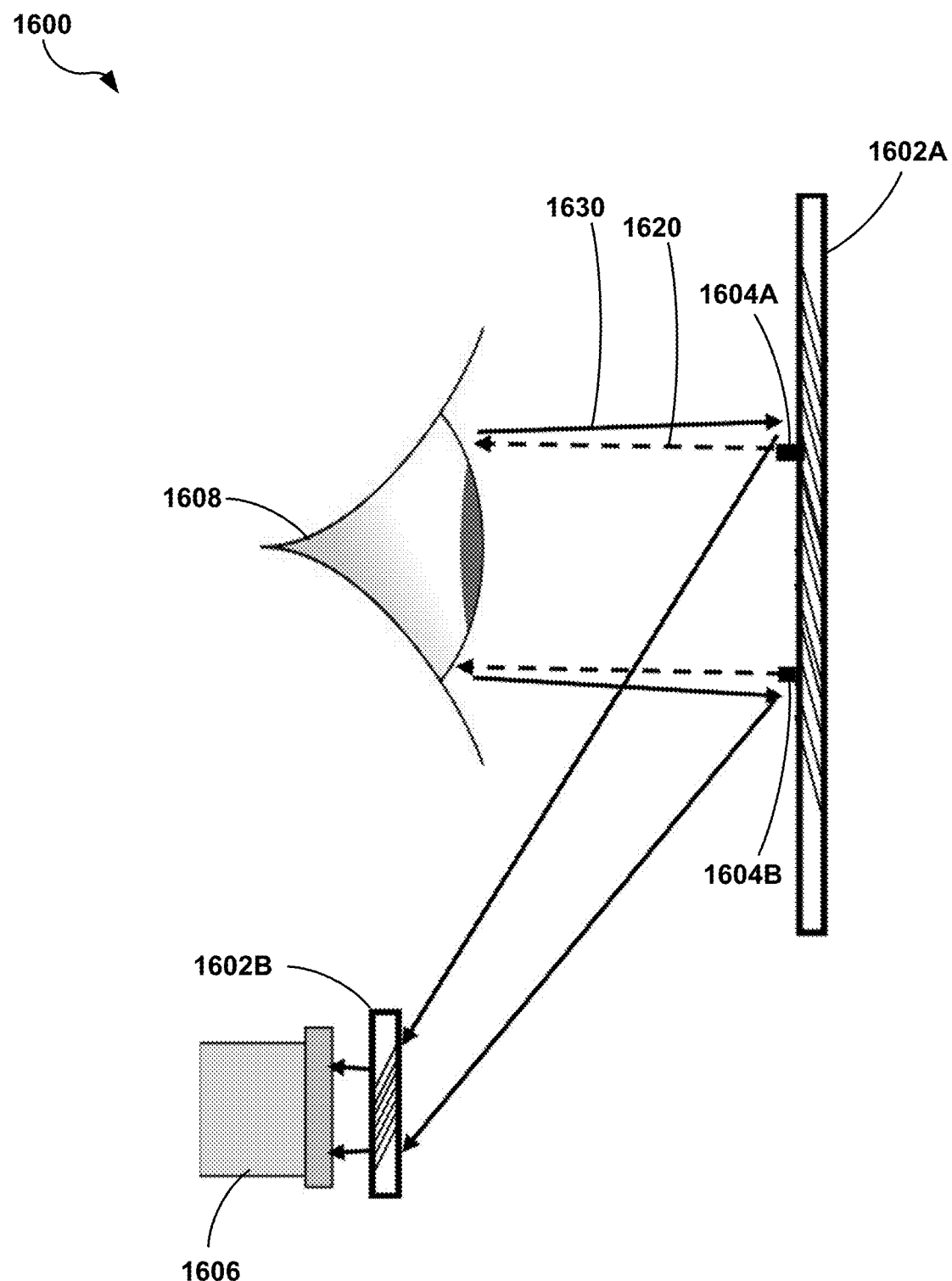
FIG. 15 is an illustration depicting an example eye-tracking system, in accordance with the techniques described in this disclosure.

FIG. 15 is an illustration depicting an example eye-tracking system 1600, in accordance with the techniques described in this disclosure. The example eye-tracking system 1600 includes two DT-PBS 1602A and 1602B, light sources 1604A and 1604B, camera 1606, and eye 1608. In some examples, the eye-tracking system 1600 may allow for a more compact optical system, and/or a system having an alternative, e.g., smaller, form factor that eases and/or improves packaging of the eye-tracking system. In the example shown, eye-tracking system 1600 includes two DT-PBS 1602 in a reflective-transmissive configuration. In some examples, use of at least two DT-PBS 1602 in eye-tracking system 1600 may allow for dispersion compensation as described above with respect to FIGS. 7A-C and the use of broadband sources for eye-tracking, for example, in order to form a clear image of either the sources reflected by eye 1608 and/or the illuminated eye 1608.

In the example shown, eye-tracking system 1600 includes light sources 1604A and 1604B, e.g. "light sources 1604," collectively. In the example shown, light sources 1604 are located near and/or adjacent to a surface of DT-PBS 1602A and configured to illuminate eye 1608. In some examples, eye-tracking system 1600 may include only a single light source 1604, and in other examples eye-tracking system 1600 may include three or more light sources 1608. In some examples, light sources 1604 may be a ring of light sources 1604 configured to illuminate eye 1608 from a plurality of angles. In some examples, light sources 1604 emit near infrared (NIR) light.

In the example shown, light sources 1604 may be point-like sources, for example, LEDs, micro-LEDs, lasers, VCSEL laser diodes, etc. In some examples, light from light sources 1604 may include a broad range of wavelengths (e.g. broadband), may include a narrow band of wavelengths, may be monochromatic, or may include any combination of broadband, narrowband, and/or monochromatic light sources. In the example shown, light 1620 from light sources 1604 may be broadband and/or unpolarized.

In the example shown, light 1620 from light sources 1604 may reflect from eye 1608. In some examples, eye 1608 may be a user's eye, e.g. user 110. In some examples, eye 1608 may be a camera, such as an eyeball camera used in place of user's 110 eye.

In the example shown, reflected light 1630 is incident on first DT-PBS 1602A. First polarization sensitive light director 1602A may be a reflective DT-PBS. For example, reflected light 1630 may be both reflected and redirected, e.g. reflected at an angle other than the incident angle with opposite sign as in reflection via a mirror, by first DT-PBS 1602 towards second DT-PBS 1602B. First DT-PBS 1602A may be any DT-PBS, for example, any of the DT-PBS discussed above such as a H-PDLC, a PVG, etc. In some examples, first DT-PBS 1602A is configured to both reflect and redirect light of a first polarization, e.g. a selected polarization. The selected polarization may be linear, circular, or elliptical. In some examples, first DT-PBS 1602A may be configured to additionally convert the selected polarization to a second polarization, e.g. a second polarization orthogonal to the selected polarization.

In the example shown, second DT-PBS 1602B is positioned in the light path substantially between first DT-PBS 1602A and camera 1606. In the examples shown, second DT-PBS 1602B transmits and redirects incident light, e.g. reflected light 1630, towards camera 1608. In the example shown, second DT-PBS 1602B may be a transmissive polarization sensitive light director. For example, light may be both transmitted and redirected, e.g. transmitted at an angle other than the incident angle as in transmission through a window. Second DT-PBS 1602B may be any DT-PBS, for example, any of DT-PBS discussed above such as a H-PDLC, a PVG, etc. In some examples, second DT-PBS 802B is additionally configured to convert either of the first (e.g. selected) or the second polarization to an orthogonal polarization, e.g. to convert the selected polarization to the second polarization or to convert the second polarization to the selected polarization. In general, first DT-PBS 1602A and second polarization light director 1602B are configured to work in conjunction to redirect at least a portion of reflected light 1630 towards detector 1606.

In some examples, detector 1606 may be any type of camera, for example, a silicon-based CCD array camera, a CMOS array camera, a camera having an infrared sensitive (e.g. near-infrared, short-infrared, mid-wave infrared, long-wave infrared sensitive) focal plane array such as a mercury cadmium telluride array, an indium antimonide array, an indium gallium arsenide array, a vanadium oxide array, etc. In another example, detector 1606 may be a position sensitive detector (PSD).

Figure 16:
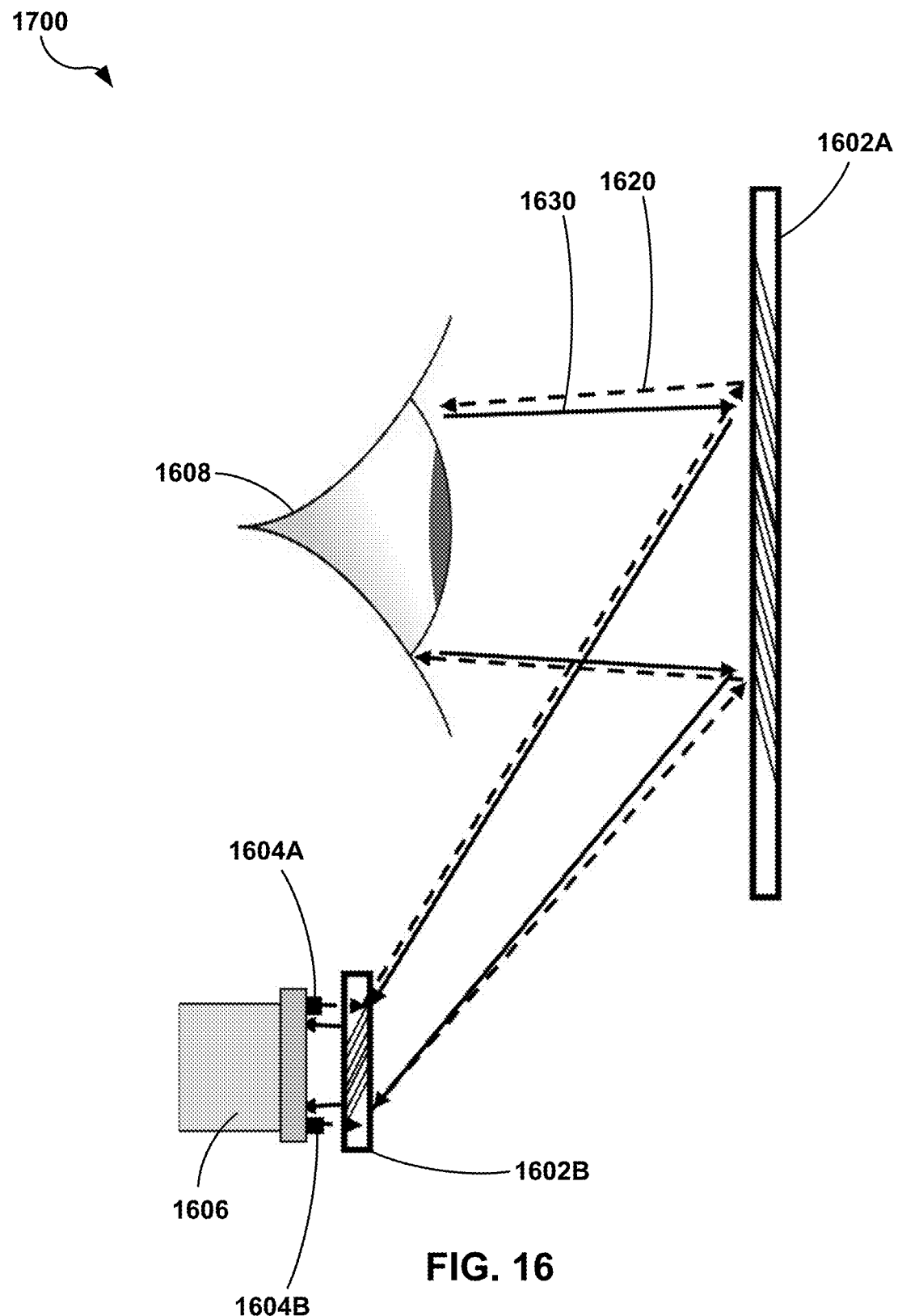
FIG. 16 is an illustration depicting an example eye-tracking system, in accordance with the techniques described in this disclosure.

FIG. 16 is an illustration depicting an example eye-tracking system 1700, in accordance with the techniques described in this disclosure. The example eye-tracking system 1700 is similar to the eye-tracking system 1600 with the location of the light sources 1604 changed to being near and/or adjacent to camera 1606 and configured to illuminate eye 1608 via reflection and redirection by both DT-PBS 1602A and 1602B. In the example shown, light 1620 from light sources 1604 is incident on second DT-PBS 1602B, which may transmit and redirect light 1620 of a selected polarization towards first DT-PBS 1602A. First DT-PBS 1602A may then reflect and redirect the selected polarization of light 1620 towards eye 1608, which reflects the light (e.g. reflected light 1630) back towards first DT-PBS 1602A. First and second DT-PBS 1602A and 1602B then redirect reflected light 1630 towards detector 1606 as described above with respect to FIG. 15. In some examples, light sources 1604 may be located near and/or adjacent to second DT-PBS 1602B, and in some examples light sources 1604 may be located anywhere in the optical path between eye 1608 and detector 1606 as illustrated in FIG. 16.

FIG. 17 is an illustration depicting an example eye-tracking system 1800, in accordance with the techniques described in this disclosure. The example eye-tracking system 1800 is similar to the eye-tracking system 1600 with the location of the light sources 1604 (not shown) being anywhere in the optical path between eye 1608 and detector 1606 and configured to illuminate eye 1608. Eye 1608 reflects light from light sources 1604, resulting in at least a portion of reflected light 1630 being directed towards first DT-PBS 1802A. In the example shown, eye-tracking system 1800 includes two DT-PBS 1802 in a reflective-reflective configuration.

In the example shown, first DT-PBS 1802A may be a DT-PBS configured to both reflect and redirect reflected light 1630 of a selected polarization towards DT-PBS 1802B, and may be similar to or substantially the same as first DT-PBS 1602A as described above with respect to FIG. 15.

In the example shown, second DT-PBS 1802B is positioned in the light path substantially between DT-PBS 1802A and detector 1606. Second DT-PBS 1802B may be configured to both reflect and redirect reflected light 1630 towards detector 1608. In the example shown, second DT-PBS 1602B may be a reflective DT-PBS, and may be similar to or substantially the same as first DT-PBS 1602A as described above with respect to FIGS. 15 and 16. In some examples, the reflective-reflective configuration of eye-tracking system 1800 may allow for a different and/or more compact eye-tracking form factor, in addition to dispersion compensation via the use of two DT-PBS 1802 as described with respect to FIGS. 7A-7C.

FIG. 18 is an illustration depicting an example eye-tracking system 1900, in accordance with the techniques described in this disclosure. The example eye-tracking system 1900 is similar to the eye-tracking system 1600 with the location of the light sources 1604 (not shown) being anywhere in the optical path between eye 1608 and detector 1606 and configured to illuminate eye 1608. Eye 1608 reflects light from light sources 1604, resulting in at least a portion of reflected light 1630 being directed towards first DT-PBS 1902A. In the example shown, eye-tracking system 1900 includes two DT-PBS 1902 in a transmissive-transmissive configuration.

In the example shown, first DT-PBS 1902A may be a transmissive DT-PBS configured to both transmit and redirect reflected light 1630 of a selected polarization towards second DT-PBS 1902B, and may be similar to or substantially the same as second DT-PBS 1602B as described above with respect to FIG. 15.

In the example shown, second DT-PBS 1902B is positioned in the light path substantially between first DT-PBS 1902A and detector 1606. Second DT-PBS 1902B may be configured to both transmit and redirect reflected light 1630 towards detector 1608. In the example shown, second DT-PBS 1902B may be similar to or substantially the same as second DT-PBS 1602B described above with respect to FIG. 15. In some examples, the transmissive-transmissive configuration of eye-tracking system 1900 may allow for a different and/or more compact eye-tracking form factor, in addition to dispersion compensation via the use of two DT-PBS 1902 as describe with respect to FIGS. 7A-7C.

FIG. 19 is an illustration depicting an example eye-tracking system 2000, in accordance with the techniques described in this disclosure. The example eye-tracking system 2000 is similar to the eye-tracking system 1600 with the location of the light sources 1604 (not shown) being anywhere in the optical path between eye 1608 and detector 1606 and configured to illuminate eye 1608. Eye 1608 reflects light from light sources 1604, resulting in at least a portion of reflected light 1630 being directed towards first DT-PBS 2002A. In the example shown, eye-tracking system 2000 includes two DT-PBS 2002 in a transmissive-reflective configuration.

In the example shown, first polarization sensitive light director 2002A may be a transmissive polarization sensitive light director configured to both transmit and redirect reflected light 1630 of a selected polarization towards second polarization sensitive light director 2002B, and may be similar to or substantially the same as second polarization sensitive light director 1602B as described above with respect to FIG. 15.

In the example shown, second polarization sensitive light director 2002B is positioned in the light path substantially between first polarization sensitive light director 2002A and detector 1606. Second DT-PBS 2002B may be configured to both reflect and redirect reflected light 1630 towards detector 1608. In the example shown, second DT-PBS 2002B may be similar to or substantially the same as first DT-PBS 1602A as described above with respect FIG. 15. In some examples, the transmissive-reflective configuration of eye-tracking system 2000 may allow for a different and/or more compact eye-tracking form factor, in addition to dispersion compensation via the use of two DT-PBS 2002 as described above with respect to FIGS. 7A-7C.

Referring now collectively to FIGS. 15-19, in some examples, either one or each of DT-PBS 1602, 1702, 1802, 1902 and 2002 may include optical power, for example, to converge or diverge light. In some examples, polarization sensitive light directors 1602, 1702, 1802, 1902, and 2002 may be curved, and in other examples polarization sensitive light directors 1602, 1702, 1802, 1902, and 2002 may impart a phase delay to the wavefront of incident light, e.g. light 1520 and/or reflected light 1630, so as converge or diverge the light.

In some examples, either one or each of polarization sensitive light directors 1602, 1702, 1802, 1902, and 2002 may be switchable, as described with respect to FIG. 14 above.

In examples provided herein, an optical assembly includes DT-PBS that are configured to redirect a first polarization state while directing a second polarization state in a different direction or without redirecting the second polarization state. Optical assemblies utilizing DT-PBS may be used in, for example, an HMD of an artificial reality systems such as HMD 112 of artificial reality system 100. A DT-PBS may redirect or leave light not redirected in several ways, depending on the configuration of the optical assembly. FIGS. 20-26 illustrate example DT-PBS and describes examples of polarization sensitive diffraction gratings which may be used as basic elements of a DT-PBS.

Figures 20A, 20B:
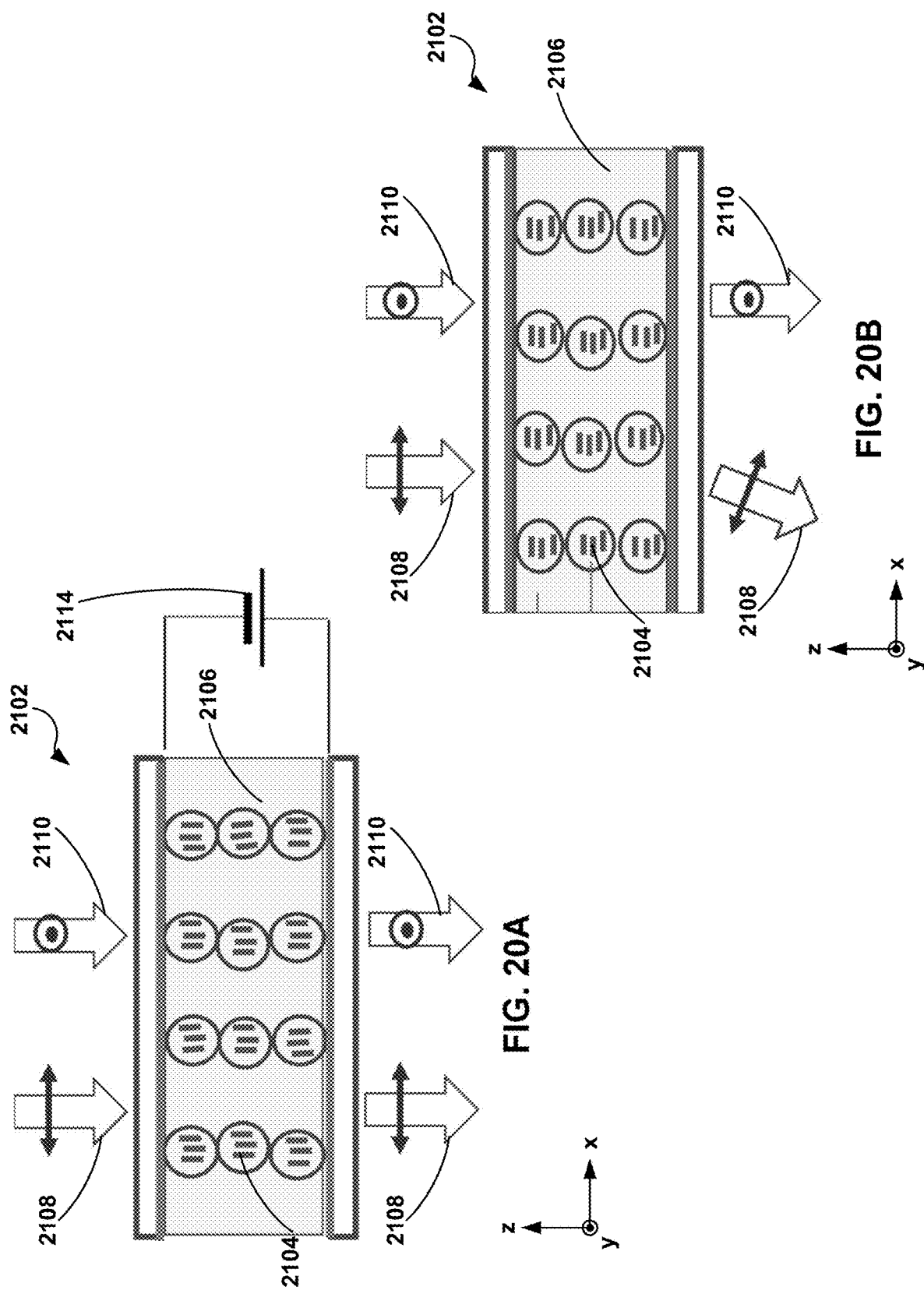
FIGS. 20A-20B are schematic diagrams illustrating a switchable holographic polymer-dispersed liquid crystal (H-PDLC) grating, in accordance with the techniques described in this disclosure.

FIGS. 20A and 20B are schematic diagrams illustrating a switchable holographic polymer-dispersed liquid crystal (H-PDLC) grating 2102 working in the Bragg regime, in accordance with the techniques described in this disclosure. The examples shown in FIGS. 20A and 20B illustrate an example diffraction grating sensitive to linear polarization. FIG. 20A illustrates H-PDLC grating 2102 in the on-state, e.g. with a voltage applied to electrodes of H-PDLC 2102, in which light having either first linear polarization 2108 and/or second linear polarization 2110 transmits through H-PDLC 2102 without being diffracted or redirected. FIG. 20B illustrates H-PDLC grating 2102 in the off-state in which light having a first linear polarization 2108 is redirected by diffraction by H-PDLC 2102 and light having a second linear polarization 2110 transmits through H-PDLC 2102 without being diffracted or redirected.

In the examples shown in FIGS. 20A and 20B, H-PDLC 2102 includes first and second substrates including isotropic polymer 2106 and liquid crystal 2104 disposed between the first and second substrates. H-PDLC 2102 may be formed with liquid crystal domains or droplets which may be aligned via holographic recording during phase separation of the isotropic polymer 2106 and liquid crystal 2104. This alignment may be modified by an external electric or magnetic field applied during phase separation. The substrates may include electrodes, or an electrode pattern, to which a voltage may be applied, thereby applying an electric field between the first and second substrates. The orientation of the liquid crystals may be controlled with the external electric field. For example, the orientation of liquid crystal along which the extraordinary refractive index of the liquid crystal material of H-PCDL 2102 aligns may be controlled, e.g., selected, by the application of a voltage to the electrodes, along with the ordinary refractive index of the liquid crystal material, which is oriented perpendicular to the extraordinary refractive index orientation.

In the examples shown in FIG. 20A, a voltage may be applied to the electrodes creating an electric field between the electrodes aligning the liquid crystal 2104 vertically, that is, the director of the liquid crystal has a major axis that is perpendicular, or substantially perpendicular, to the first and second substrates of H-PDLC 2102. In some examples, H-PDLC 2102 may include any appropriate anisotropic material dispersed in an isotropic matrix.

In the examples shown, the liquid crystal 2104 is aligned substantially vertically, that is, the liquid crystal director is perpendicular, or substantially perpendicular (e.g., to within 30 degrees from normal), to the first and second substrates of H-PDLC 2102, e.g., along the z axis as illustrated. In some examples, the ordinary refractive index of the liquid crystal 2104 matches the index of refraction of the polymer 2106. For example, $np=no<ne$, where no and ne are the ordinary and extraordinary refractive indices of the liquid crystal 2104 and np is the refractive index of the polymer. Because the liquid crystal is birefringent, the refractive index of the liquid crystal depends on the polarization and the propagation direction of light relative to the director of the liquid crystal 2104. The propagation of normally incident light 2108, 2110 is substantially parallel with the director of the liquid crystal, and therefore the effective refractive index of the liquid crystal 2104 for the light 2108, 2110 is the ordinary refractive index, no, regardless of the polarization of the normally incident light 2108, 2110. In the example shown, the polymer index np is substantially the same as the ordinary refractive index, no, of the liquid crystal 2104, and there is no index difference between the droplets of liquid crystal 2104 and the polymer 2106. Therefore, the HPDLC 2002 does not diffract the normally incident light 2108, 2110 and H-PDLC 2102 is substantially transparent to normally incident light 2108, 2110. As a result, light 2108, 2110 that is incident to H-PDLC 2102 parallel with the liquid crystal director, e.g. normally incident in the example shown, is transparently transmitted through H-PDLC 2102, e.g., transmitted with little or no redirection/diffraction.

In the example shown in FIG. 20B, a voltage may be no longer applied to the electrodes, and the liquid crystal 2104 may align according to the predetermined preferential direction, as described above. In the example shown, the preferential direction of liquid crystal 2104 is aligned substantially in-plane, that is, the liquid crystal molecules have a director that is parallel, or substantially parallel, to the first and second substrates of H-PDLC 2102, e.g. in the x-y plane as illustrated. Furthermore, the director may be aligned parallel to the grating vector of H-PDLC 2102, e.g., preferentially aligned in the x-direction. Because the liquid crystal is birefringent, the refractive index of the liquid crystal depends on the polarization and the propagation direction of light relative to the director of liquid crystal 2104, e.g. the optical axis of liquid crystal 2104. The polarization of normally incident light 2110 is substantially perpendicular with the director of liquid crystal 2104, e.g., the electrical field of incident light 2110 is perpendicular with the director of liquid crystal 2104, and therefore the effective index of the liquid crystal 2104 for the light 2110 is the ordinary refractive index, no, which substantially matches the polymer index $n_p$. Therefore, the H-PDLC 2102 grating does not diffract the normally incident light 2110, and H-PDLC 2102 is substantially transparent to normally incident light 2110. Conversely, the polarization of normally incident light 2108 is substantially parallel with the director of liquid crystal 2104, e.g., the electrical field of incident light 2108 is parallel with the director of liquid crystal 2104, and therefore the effective index of the liquid crystal 2104 for the light 2108 is the extraordinary refractive index, ne, which is mismatched with the polymer index np. Therefore, the liquid crystal 2104 droplets may redirect, e.g., diffract, the normally incident light 2108.

In some examples, the droplets of anisotropic material, e.g., liquid crystal 2104, may be interconnected within the isotropic material, e.g., the polymer, as opposed to forming isolated droplets or pores as illustrated in FIGS. 20A and 20B. In some examples, the liquid crystal 2104, or anisotropic material, can form a permanent phase in a polymer network.

In some examples, H-PDLCs, such as H-PDLC 2102, are sensitive to linear polarization. In some examples, H-PDLC 2102 may be switchable by switching the polarization direction of the incident light. In other examples, H-PDLC 2102 may be switchable by switching the orientation of the liquid crystal 2104 as described above. In some examples, H-PDLC 2102 may comprise a Bragg diffraction grating.

FIGS. 21A-21B and FIGS. 22A-22B are schematic diagrams illustrating different example of grating sensitive to linear polarization in accordance with the techniques described in this disclosure, namely, liquid crystal filled surface relief gratings (LC-SRG) 2200, 2300.

Figure 21B:
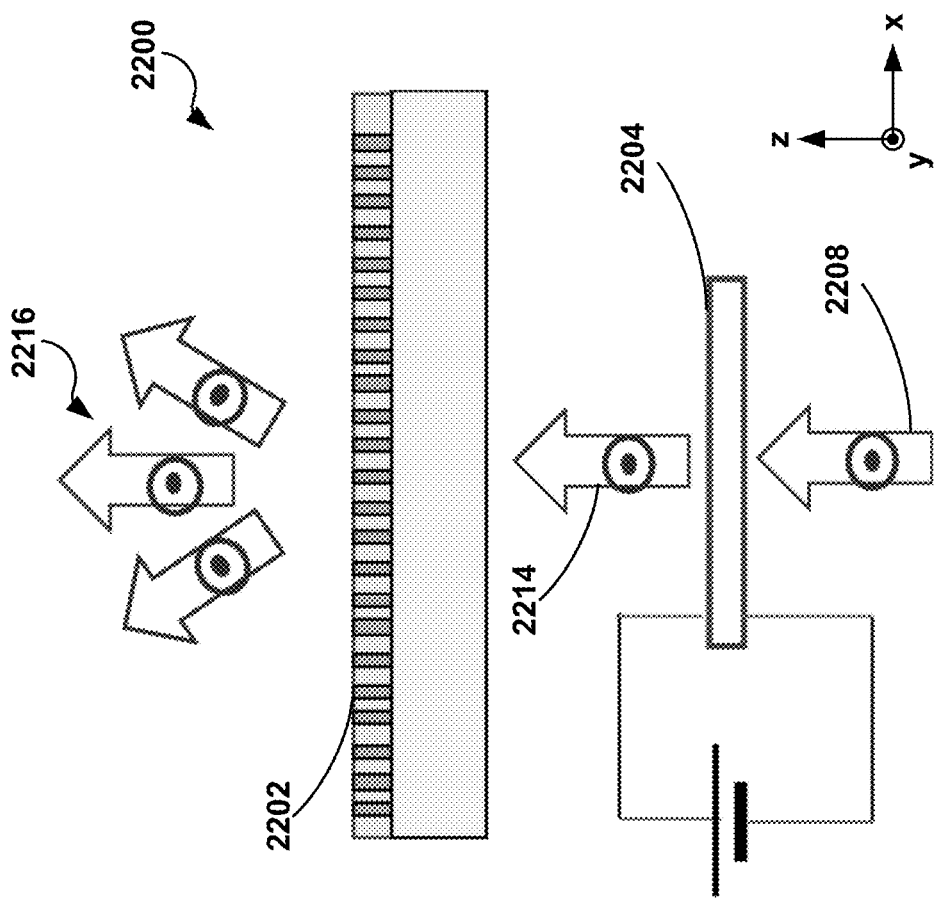
FIGS. 21A-21B are schematic diagrams illustrating an example liquid crystal surface relief grating (LC-SRG), in accordance with the techniques described in this disclosure.
Figure 21A:
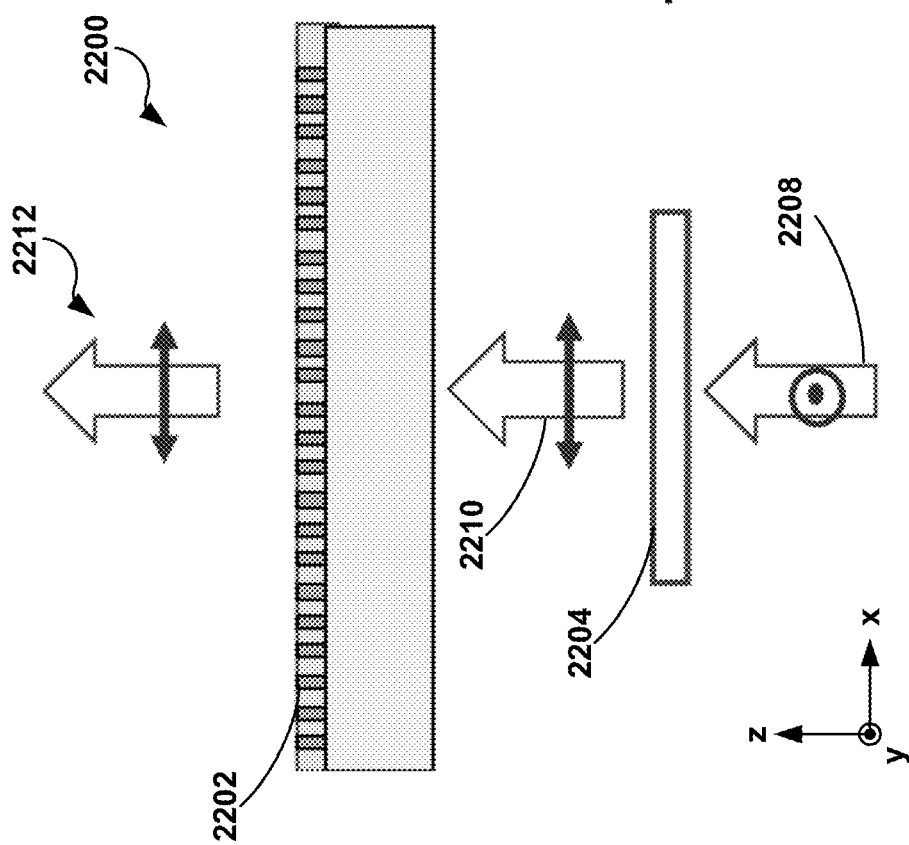

In the example shown in FIGS. 21A and 21B, LC-SRG 2200 includes a passive diffraction grating 2202 and a linear polarization rotator 2204. Passive diffraction grating 2202 may have a surface relief profile formed in a substrate, e.g., via etching, imprinting, etc., and the spaces of the profile may be filled with a birefringent material, for example, a liquid crystal. In some examples, linear polarization rotator 2204 may be a switchable twisted-nematic liquid crystal cell, a switchable half-wave plate, or any other appropriate linear polarization rotator.

In the example shown in FIG. 21A, incident light 2208 having a first linear polarization transmits through linear polarization rotator 2204, which rotates the polarization of incident light 2208 by 90 degrees such that transmitted light 2210 has a second linear polarization that is substantially perpendicular to the first linear polarization. The director of the liquid crystal material filling the surface relief pattern spaces may be aligned perpendicularly to the second linear polarization of light 2210 and may have an ordinary refractive index that substantially matches the index of the surface relief profile formed in the substrate of passive diffraction grating 2202. As such, the effective index of refraction for light 2210, because its polarization is orthogonal to the liquid crystal director, will be the ordinary refractive index and the light 2210 will transmit through passive diffraction grating 2202 without redirection and/or diffraction, and will exit with the second linear polarization as light 2212.

In the example shown in FIG. 21B, a voltage may be applied to linear polarization rotator 2204 switching its rotation state as compared with FIG. 21A. For example, incident light 2208 having a first linear polarization transmits through linear polarization rotator 2204 without rotation of its linear polarization such that transmitted light 2214 retains the first linear polarization. As such, the effective index of refraction for light 2214, because its polarization is parallel to the liquid crystal director, will be the extraordinary refractive index. Because of the index mismatch between the material of the surface relief profile formed in the substrate (e.g. or disposed on the substrate), passive diffraction grating 2202 will function as a phase diffraction grating for light 2214. As such, light 2214 will be redirected, e.g. diffracted, by passive diffraction grating 2202, and will exit with the first linear polarization and diffracted based on the phase profile induced by the index profile of the passive diffraction grating 2202 as diffracted light 2214.

In some examples, any of the DT-PBS 802-1202, 1502-1602, and 1802-2002 in any of the display systems 800-1300, 1500 and eye-tracking systems 1600-200, described above with respect to FIGS. 8-12 and 14-19, may include LC-SRG 2200

Figure 22B:
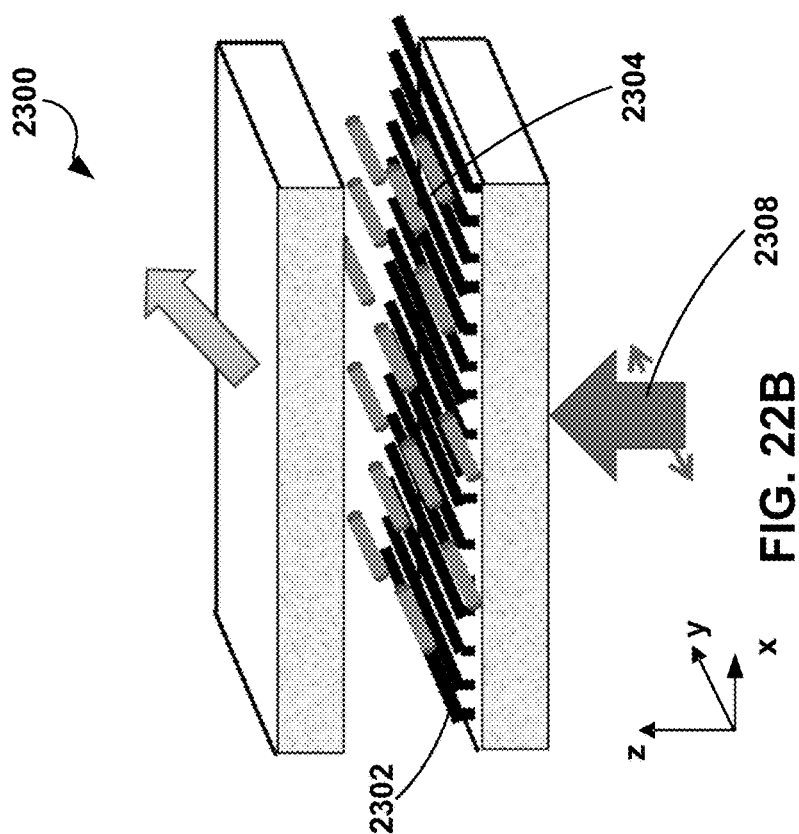
FIGS. 22A-22B are schematic diagrams illustrating another example LC-SRG, in accordance with the techniques described in this disclosure.
Figure 22A:
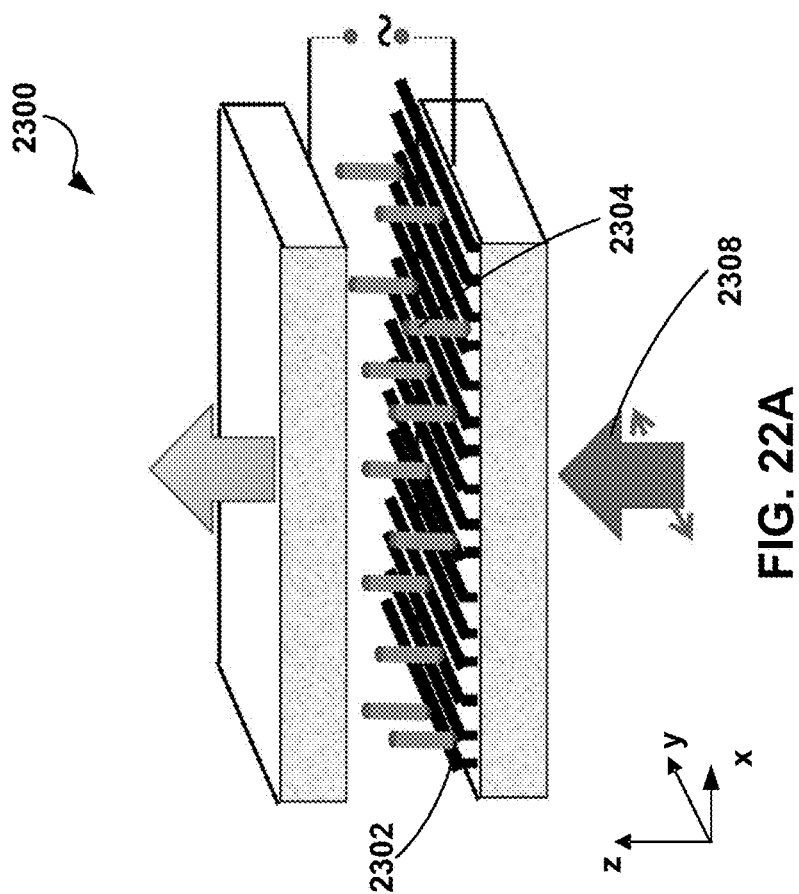

In the example shown in FIGS. 22A and 22B, LC-SRG 2300 includes an active diffraction grating 2302 comprising a surface relief pattern formed on the surface of one or both of opposing substrates, and the spaces of the profile may be filled with a birefringent material, for example, a liquid crystal. In some examples, the orientation of the liquid crystal may be selected by applying a voltage to an electrode, or an electrode pattern, disposed on the substrates.

In the example shown in FIG. 22A, incident light 2308 having a first linear polarization may transmits through LC-SRG 2300. The liquid crystal filling the spaces of active grating 2302 may have an ordinary refractive index that substantially matches the index of the surface relief profile, and an extraordinary index of refraction mismatched with the index of the surface relief profile. A voltage may be applied to the electrodes of LC-SRG 2300, forming and electric field between the opposing substrates with which the liquid crystal may align. In the example shown, the director of the liquid crystal is aligned by the electric field to be perpendicular to the substrates and parallel with the propagation direction of incident light 2308. As such, the effective index of the refraction for incident light 2308 of the liquid crystal is the ordinary refractive index regardless of the polarization of incident light 2308. Therefore, the index of the liquid crystal matches the index of the surface relief profile, and incident light 2308 transmits through LC-SRG 2300 without diffraction.

In the example shown in FIG. 22B, a voltage is not applied to the electrodes of LC-SRG 2300, and the liquid crystal is aligned with its preferential alignment. In the example shown, the preferential alignment is along the grooves of the surface relief profile, e.g. parallel to the y-axis. For incident light 2308 having a first linear polarization parallel to the director of the liquid crystal, e.g. along the y-axis, the effective index of the liquid crystal will be the extraordinary index and mismatched with the index of the surface relief profile. As such, incident light 2308 having the first linear polarization will diffracted and redirected, based on the phase profile pattern resulting from the surface relief profile.

In some examples, both LC-SRG 2200 and 2300 may be designed as a Raman-Natt or a Bragg diffraction grating. In some examples, both LC-SRG 2200 and 2300 may be either transmissive or reflective, e.g. transmit and redirect (e.g. diffract) at least a portion of incident light or reflect and diffract (e.g., redirect) at least a portion of incident light. In some examples, any of the DT-PBS 802-1202, 1502-1602, and 1802-2002 in any of the display systems 800-1300, 1500 and eye-tracking systems 1600-200, described above with respect to FIGS. 8-12 and 15-20, may include LC-SRG 2300.

FIGS. 23A-23F are schematic diagrams illustrating examples of a PBP grating 2400, a reflective PVG (r-PVG) 2430, and a transmissive PVG (t-PVG) 2460, in accordance with the techniques described in this disclosure. Each of PBP grating 2400, r-PVG 2430, and t-PVG 2460 may be configured to exhibit polarization sensitive light splitting and redirection, in accordance with the techniques described in this disclosure. In some examples, any of the DT-PBS 802-1202, 1502-1602, and 1802-2002 in any of the display systems 800-1300, 1500 and eye-tracking systems 1600-200, described above with respect to FIGS. 8-12 and 15-20, may include PBP grating 2400, r-PVG 2430, and/or t-PVG 2460. The examples shown in FIGS. 23A-23F illustrate example diffraction gratings sensitive to circular polarization. For example, PBP 2400, r-PVG 2430, and t-PVG 2460 or PBP 2450 may transmit and redirect light of both right circular polarization and left circular polarization in different directions, e.g., via different diffraction orders.

FIG. 23A is a cross-sectional schematic diagram illustrating an example molecular orientation of PBP grating 2400, in accordance with the techniques described in this disclosure. FIG. 23B is a cross-sectional schematic diagram illustrating an example optical response of PBP grating 2400, in accordance with the techniques described in this disclosure. In some examples, PBP grating 2400 is a liquid crystal optical element that includes one or more layers of liquid crystals. In some examples, PBP grating 2400 includes a layer of other type of substructures, e.g., nanopillars composed of high refraction index materials.

As shown in FIG. 23A, the orientations of the liquid crystals 2402 remain constant along the z-direction. In some examples, PBP grating 2400 that has constant orientation along the z-axis and a birefringent thickness ($\Delta n \times d$) that is ideally half of the designed wavelength, where $\Delta n$ is the birefringence of the liquid crystal material and d is the physical thickness of the liquid crystal material of the PBP lens 2400. In the example shown in FIG. 23A, PBP grating 2400 has a grating pitch A, which may be defined as a distance along x-axis at which the azimuth angle of liquid crystals 2402 have rotated 180 degrees from the initial orientation.

In some examples, PBP grating 2400 may have a liquid crystal structure that is different from the one shown in FIG. 23A. For example, a PBP grating 2400 may include a double twist liquid crystal structure along the z-direction. In another example, a PBP grating may include a three-layer alternate structure along the z-direction in order to provide achromatic response across a wide spectral range.

As shown in FIG. 23B, PBP grating 2400 may polarize and redirect incident light based on polarization. For example, PBP grating 2400 may split, e.g., redirect non-polarized light via redirection based on polarization. In the examples shown, PBP grating 2400 redirects an LCP portion of incident non-polarized light in a first transmitted direction and redirects an RCP portion of incident non-polarized light in a second transmitted direction, thereby polarizing and redirecting incident light based on circular polarization.

FIG. 23C is a cross-sectional schematic diagram illustrating an example molecular orientation of r-PVG 2430, in accordance with the techniques described in this disclosure. FIG. 23D is a cross-sectional schematic diagram illustrating an example optical response of r-PVG 2430, in accordance with the techniques described in this disclosure. In some examples, r-PVG 2430 is a liquid crystal optical element that includes one or more layers of liquid crystals. In some examples, r-PVG 2430 includes a layer of other type of substructures, e.g., nanopillars composed of high refraction index materials.

As shown in FIG. 23C, the orientations of the liquid crystals 2402 may be slanted, e.g., liquid crystals 2432 may be arranged in a helical arrangement along the z-direction. In some examples, r-PVG 2430 may be formed via surface mediated photoalignment, e.g., via liquid crystals 2432 doped with a chiral dopant additive. In some examples, r-PVG 2430 may be a Bragg diffraction grating including a Bragg grating pitch AB, at angle $\theta$ with respect to the surface of r-PVG 2430.

As shown in FIG. 23D, r-PVG 2430 may polarize and redirect incident light based on polarization. For example, r-PVG 2430 may split, e.g., redirect non-polarized light via redirection based on polarization. In the examples shown, r-PVG 2430 redirects an LCP portion of incident non-polarized light in a first reflected direction and transmits an RCP portion of incident non-polarized light in without redirection, thereby polarizing and splitting incident light based on circular polarization. In other examples, r-PVG 2430 redirects an RCP portion of incident non-polarized light in a first reflected direction and transmits an LCP portion of incident non-polarized light in without redirection, thereby polarizing and splitting incident light based on circular polarization.

FIG. 23E is a cross-sectional schematic diagram illustrating an example molecular orientation of t-PVG 2460, in accordance with the techniques described in this disclosure. FIG. 23F is a cross-sectional schematic diagram illustrating an example optical response of t-PVG 2460, in accordance with the techniques described in this disclosure. In some examples, t-PVG 2460 is a liquid crystal optical element that includes one or more layers of liquid crystals. In some examples, t-PVG 2460 includes a layer of other type of substructures, e.g., nanopillars composed of high refraction index materials.

As shown in FIG. 23E, the orientations of the liquid crystals 2462 may be slanted, e.g., liquid crystals 2462 may have a constant orientation in a direction $\theta$ with respect to the z-axis. In some examples, t-PVG 2460 may be formed via bulk mediated photoalignment, e.g., via recording the orientation structure in a thick layer of photosensitive LC polymer. In some examples, t-PVG 2460 may be a Bragg diffraction grating including a Bragg grating pitch AB, at angle $\theta$ with respect to the surface of t-PVG 2460.

As shown in FIG. 23F, t-PVG 2460 may polarize and redirect incident light based on polarization. For example, t-PVG 2460 may split, e.g., redirect non-polarized light via redirection based on polarization. In the examples shown, t-PVG 2460 redirects an LCP portion of incident non-polarized light in a first transmitted direction and transmits an RCP portion of incident non-polarized light in without redirection, thereby polarizing and splitting incident light based on circular polarization. In other examples, t-PVG 2460 redirects an RCP portion of incident non-polarized light in a first transmitted direction and transmits an LCP portion of incident non-polarized light in without redirection, thereby polarizing and splitting incident light based on circular polarization.

FIGS. 24-26 are schematic diagrams illustrating example liquid crystal shutters in combination with a passive diffraction grating, in accordance with the techniques described in this disclosure. In the examples shown, a passive diffraction grating may be a LC filled surface relief grating (LC-SRG), an H-PDLC gratings, a PVG, a PBP gratings or any other type of polarization sensitive diffraction grating. The liquid crystal shutters illustrated in FIGS. 24-26 may each be an example of a pixelated DT-PBS, such as DT-PBS 1502A and 1502B described above with respect to FIG. 14.

FIGS. 24A and 24B are schematic diagrams illustrating a switchable, pixelated birefringence type liquid crystal (LC) shutter 2500. In the examples shown, LC shutter 2500 includes a pair of orthogonal polarizers, e.g. polarizers 1 and 2, with a LC cell disposed between. In the example illustrated in FIG. 24A, incident light 2502 may be of any polarization or may be randomly polarized, e.g. unpolarized. Incident light 2502 passes through polarizer 1 and is then linearly polarized. The LC cell rotates the polarization of the light 90 degrees, and the light then passes through polarizer 2 with a substantially high transmission. The dark and bright states can be spatially distributed by pixelation of the shutter. The light from the not shut down sections of the light flux is then redirected by passive grating 2504.

In the example illustrated in FIG. 24B, incident light 2502 may be of any polarization or may be randomly polarized, e.g. unpolarized. Incident light 2502 passes through polarizer 1 and is then linearly polarized. The LC cell may have a voltage applied to transparent conductors on opposing substrates of the LC cell thereby forming an electric field between the electrodes and changing the alignment of the liquid crystal. The amount of rotation may be controlled by the voltage applied. In the example shown, the liquid crystal is rotated such that the polarization of the light is not rotated, and the light does not substantially transmit through polarizer 2, e.g. is absorbed or reflected based on the type of polarizer. Because shutters of these type comprise linear polarizers, they may work in combination with the gratings sensitive to linear polarization of light.

FIGS. 25A and 25B are schematic diagrams illustrating a switchable, pixelated guest-host liquid crystal (LC) shutter 2600. In the examples shown, LC shutter 2600 includes a dichroic dye 2606 dissolved in the liquid crystal 2608 of a liquid crystal cell, and a passive diffraction grating 2604. The dye molecules (guest) align with the LC molecules (host). The dye causes only a slight absorption when the LC is in a first state, e.g. with a voltage applied such that the long axis of the liquid crystal is perpendicular to the surfaces of the LC cell (FIG. 25A bright state), and a strong absorption when the LC is in a second state, e.g. without a voltage applied and the long axis of the liquid crystal molecules is parallel to the plane of the LC cell (FIG. 25B dark state). In some examples, the bright state and the dark state may be reversed for a LC cell having the opposite anisotropy, e.g. negative as opposed to positive anisotropy.

FIGS. 26A and 26B are schematic diagrams illustrating a switchable, pixelated, scattering liquid crystal (LC) shutter 2700. In the examples shown, LC shutter 2700 includes a LC scattering cell 2710 and a passive diffraction grating 2704. In some examples, LC scattering cell 2710 may be a switchable polymer dispersed liquid crystal cell (PDLC). The liquid crystal may have an ordinary refractive index substantially matched with the polymer index of refraction of the PDLC, and an extraordinary index of refraction that is substantially mismatched with the polymer index of refraction.

In the example illustrated in FIG. 26A, incident light 2702 may be of any polarization or may be randomly polarized, e.g. unpolarized. In the example shown, the director of the liquid crystal in LC scattering cell 2710 may aligned along the preferential alignment, e.g., perpendicular to the surfaces of the PDLC (and in the x-y plane). Regardless of the polarization of incident light 2702, the polarization will be perpendicular to the director of the liquid crystal and the effective index of the LC scattering cell 2710 will be the ordinary refractive index and matched to the polymer. As such, incident light 2702 will not be scattered and will transparently transmit through LC scattering cell 2710 and diffract via passive diffraction grating 2704.

In the example illustrated in FIG. 26B, a voltage may be applied to transparent conductors on opposing substrates of the LC scattering cell 2710 thereby forming an electric field between the electrodes and changing the alignment of the liquid crystal. The amount of rotation may be controlled by the voltage applied. Because the LC droplets may be randomly distributed in the LC scattering cell 2710 volume between the substrates, the light 2702 will see a random pattern of mismatched index interfaces, and will scatter randomly, including backscatter, and the transmission of incident light 2702 will be substantially reduced.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An optical assembly comprising:
a display;
a light source for illuminating the display; and
a first diffraction type polarizing beam splitter (DT-PBS) configured to direct light from a first light director, wherein the first DT-PBS is polarization sensitive and configured to direct, based on polarization, a first portion of light towards the display,
wherein the first light director is a DT-PBS configured to compensate for a spectral dispersion of the first DT-PBS.

2. The optical assembly of claim 1, wherein the display is a liquid crystal on silicon (LCoS) display.

3. The optical assembly of claim 1, further comprising a polarizer disposed in the optical path between the light source and the first DT-PBS.

4. The optical assembly of claim 1, wherein the first light director is configured to direct, based on polarization, the first portion of light towards the first DT-PBS.

5. The optical assembly of claim 1, wherein at least portions of at least one of the first DT-PBS and first light director are electronically controllable to selectively direct, based on polarization, the first portion of light when activated and to not direct the first portion of light when deactivated.

6. The optical assembly of claim 1, wherein at least one of the first DT-PBS and first light director comprise one of a reflective or transmissive polarization volume grating, Pancharatnam-Berry Phase (PBP) grating, a liquid crystal filled surface relief grating, or a holographic polymer dispersed liquid crystal grating.

7. The optical assembly of claim 1, wherein at least one of the first DT-PBS and first light director reflect and direct or transmit and direct, based on polarization, the first portion, wherein at least one other of the first DT-PBS and first light director reflect and direct or transmit and direct, based on polarization, the first portion.

8. The optical assembly of claim 1, wherein the first DT-PBS is configured to direct light from the display, based on polarization, towards a target.

9. The optical assembly of claim 1, further comprising:
a second display;
a second DT-PBS configured to direct light from a second light director, wherein the second DT-PBS is polarization sensitive and configured to direct, based on polarization, a second portion of light towards the second display.

10. A head mounted display (HMD) comprising:
a display;
a light source for illuminating the display; and
a first diffraction type polarizing beam splitter (DT-PBS) configured to direct light from a first light director, wherein the first DT-PBS is polarization sensitive and configured to direct, based on polarization, a first portion of light towards the display,
wherein the first light director is a DT-PBS configured to compensate for a spectral dispersion of the first DT-PBS.

11. The HMD of claim 10, further comprising a polarizer disposed in the optical path between the light source and the first DT-PBS, and wherein the display is a liquid crystal on silicon (LCoS) display.

12. The HMD of claim 10, wherein the first light director is configured to direct, based on polarization, the first portion of light towards the first DT-PBS, wherein at least portions of at least one of the first DT-PBS and first light director are electronically controllable to selectively direct, based on polarization, the first portion of light when activated and to not direct the first portion of light when deactivated.

13. The HMD of claim 10, wherein the first light director is a DT-PBS and configured to direct, based on polarization, the first portion of light towards the first DT-PBS.

14. The HMD of claim 10, wherein at least one of the first DT-PBS and first light director comprise one of a reflective or transmissive polarization volume grating, PBP grating, a liquid crystal filled surface relief grating, or a holographic polymer dispersed liquid crystal grating.

15. The HMD of claim 10, wherein at least one of the first DT-PBS and first light director reflect and direct, based on polarization, the first portion of light.

16. The HMD of claim 10, further comprising:
a second display;
a second DT-PBS configured to direct light from a second light director, wherein the second DT-PBS is polarization sensitive and configured to direct, based on polarization, a second portion of light towards the second display.

17. A method of directing light comprising:
directing light from a light source to a first diffraction type polarizing beam splitter (DT-PBS) by a first light director;
redirecting a first polarization of light towards a display by the first DT-PBS; and
compensating, via the first light director, for a spectral dispersion of the first DT-PBS, wherein the first light director is a DT-PBS.

18. The method of claim 17, further comprising:
at least one of converging or diverging the light by at least one of the first and second DT-PBS.

* * * * *